United States Patent
Naing et al.

(10) Patent No.: US 11,451,815 B2
(45) Date of Patent: *Sep. 20, 2022

(54) IMAGE CODING METHOD AND IMAGE CODING APPARATUS

(71) Applicant: Sun Patent Trust, New York, NY (US)

(72) Inventors: Sue Mon Thet Naing, San Jose, CA (US); Chong Soon Lim, Singapore (SG); Kyaw Kyaw Win, Singapore (SG); Hai Wei Sun, Singapore (SG); Viktor Wahadaniah, Singapore (SG); Takahiro Nishi, Nara (JP); Hisao Sasai, Osaka (JP); Youji Shibahara, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,659

(22) Filed: Dec. 17, 2020

(65) Prior Publication Data

US 2021/0105498 A1    Apr. 8, 2021

Related U.S. Application Data

(63) Continuation of application No. 16/808,524, filed on Mar. 4, 2020, now Pat. No. 10,904,554, which is a (Continued)

(51) Int. Cl.
*H04N 19/51* (2014.01)
*H04N 19/70* (2014.01)
(Continued)

(52) U.S. Cl.
CPC .......... *H04N 19/51* (2014.11); *H04N 19/105* (2014.11); *H04N 19/107* (2014.11);
(Continued)

(58) Field of Classification Search
None
See application file for complete search history.

(56) References Cited

U.S. PATENT DOCUMENTS

| 7,643,559 B2 | 1/2010 | Kato et al. |
| 8,374,245 B2 | 2/2013 | Tourapis et al. |

(Continued)

FOREIGN PATENT DOCUMENTS

| CN | 1917647 | 2/2007 |
| CN | 101156451 | 4/2008 |

(Continued)

OTHER PUBLICATIONS

Summons to attend oral proceedings pursuant to Rule 115(1) EPC dated Dec. 16, 2020 in European Patent Application No. 13757485.1.

(Continued)

*Primary Examiner* — Peter D Le
(74) *Attorney, Agent, or Firm* — Wenderoth, Lind & Ponack, L.L.P.

(57) ABSTRACT

An image coding method includes: selecting a first picture from plural pictures; setting a first temporal motion vector prediction flag which is associated with the first picture and is a temporal motion vector prediction flag indicating whether or not temporal motion vector prediction is to be used, to indicate that the temporal motion vector prediction is not to be used, and coding the first temporal motion vector prediction flag; coding the first picture without using the temporal motion vector prediction; and coding a second picture which follows the first picture in coding order, with
(Continued)

referring to a motion vector of a picture preceding the first picture in coding order being prohibited.

1 Claim, 31 Drawing Sheets

Related U.S. Application Data continuation of application No. 16/407,540, filed on May 9, 2019, now Pat. No. 10,623,762, which is a continuation of application No. 16/014,260, filed on Jun. 21, 2018, now Pat. No. 10,334,268, which is a continuation of application No. 15/840,570, filed on Dec. 13, 2017, now Pat. No. 10,034,015, which is a continuation of application No. 15/471,097, filed on Mar. 28, 2017, now Pat. No. 9,883,201, which is a continuation of application No. 13/905,724, filed as application No. PCT/JP2013/000465 on Jan. 29, 2013, now Pat. No. 9,648,323.

(60) Provisional application No. 61/594,718, filed on Feb. 3, 2012.

(51) Int. Cl.
*H04N 19/172* (2014.01)
*H04N 19/46* (2014.01)
*H04N 19/107* (2014.01)
*H04N 19/52* (2014.01)
*H04N 19/105* (2014.01)
*H04N 19/174* (2014.01)
*H04N 19/184* (2014.01)

(52) U.S. Cl.
CPC ........... *H04N 19/172* (2014.11); *H04N 19/46* (2014.11); *H04N 19/52* (2014.11); *H04N 19/70* (2014.11); *H04N 19/174* (2014.11); *H04N 19/184* (2014.11)

(56) References Cited

U.S. PATENT DOCUMENTS

| | | |
|---|---|---|
| 8,494,046 B2 | 7/2013 | Yang |
| RE44,680 E | 12/2013 | Yang |
| 9,210,440 B2 | 12/2015 | Sugio |
| 2002/0181591 A1 | 12/2002 | Francois et al. |
| 2004/0001546 A1 | 1/2004 | Tourapis et al. |
| 2004/0013308 A1 | 1/2004 | Jeon et al. |
| 2004/0052507 A1 | 3/2004 | Kondo et al. |
| 2004/0136461 A1 | 7/2004 | Kondo et al. |
| 2004/0190614 A1 | 9/2004 | Schlockermann et al. |
| 2004/0190615 A1 | 9/2004 | Abe et al. |
| 2005/0141612 A1 | 6/2005 | Abe et al. |
| 2006/0126952 A1 | 6/2006 | Suzuki et al. |
| 2006/0233254 A1 | 10/2006 | Lee et al. |
| 2006/0262981 A1 | 11/2006 | Jeon et al. |
| 2007/0177671 A1 | 8/2007 | Yang |
| 2007/0177672 A1 | 8/2007 | Yang |
| 2007/0177673 A1 | 8/2007 | Yang |
| 2007/0177674 A1 | 8/2007 | Yang |
| 2007/0177810 A1 | 8/2007 | Yang |
| 2007/0177811 A1 | 8/2007 | Yang |
| 2007/0177812 A1 | 8/2007 | Yang |
| 2007/0177813 A1 | 8/2007 | Yang |
| 2007/0268971 A1 | 11/2007 | Kato |
| 2007/0286281 A1 | 12/2007 | Tsuchiya et al. |
| 2008/0037636 A1 | 2/2008 | Jeon et al. |
| 2008/0037645 A1 | 2/2008 | Jeon et al. |
| 2008/0037646 A1 | 2/2008 | Jeon et al. |
| 2008/0037885 A1 | 2/2008 | Jeon et al. |
| 2008/0037886 A1 | 2/2008 | Jeon et al. |
| 2008/0043849 A1 | 2/2008 | Jeon et al. |
| 2008/0044093 A1 | 2/2008 | Jeon et al. |
| 2008/0044094 A1 | 2/2008 | Jeon et al. |
| 2008/0063075 A1 | 3/2008 | Kondo et al. |
| 2008/0069235 A1 | 3/2008 | Abe et al. |
| 2008/0123947 A1 | 5/2008 | Moriya et al. |
| 2008/0123977 A1 | 5/2008 | Moriya et al. |
| 2008/0130747 A1 | 6/2008 | Moriya et al. |
| 2008/0130988 A1 | 6/2008 | Moriya et al. |
| 2008/0130989 A1 | 6/2008 | Moriya et al. |
| 2008/0130990 A1 | 6/2008 | Moriya et al. |
| 2008/0137744 A1 | 6/2008 | Moriya et al. |
| 2008/0137748 A1 | 6/2008 | Kondo |
| 2008/0159641 A1 | 7/2008 | Moriya et al. |
| 2008/0165849 A1 | 7/2008 | Moriya et al. |
| 2008/0192827 A1 | 8/2008 | Beric et al. |
| 2008/0267287 A1 | 10/2008 | Hannuksela |
| 2009/0010323 A1 | 1/2009 | Su et al. |
| 2009/0016439 A1 | 1/2009 | Thoreau et al. |
| 2009/0028249 A1 | 1/2009 | Gomila et al. |
| 2009/0034856 A1 | 2/2009 | Moriya et al. |
| 2009/0034857 A1 | 2/2009 | Moriya et al. |
| 2009/0052529 A1 | 2/2009 | Kim et al. |
| 2009/0123066 A1 | 5/2009 | Moriya et al. |
| 2009/0141814 A1 | 6/2009 | Yin et al. |
| 2009/0168874 A1 | 7/2009 | Su et al. |
| 2009/0310676 A1 | 12/2009 | Yang |
| 2010/0098157 A1 | 4/2010 | Yang |
| 2010/0189173 A1 | 7/2010 | Chen et al. |
| 2010/0202539 A1 | 8/2010 | Kondo et al. |
| 2010/0215093 A1 | 8/2010 | Schlockermann et al. |
| 2010/0278267 A1 | 11/2010 | Lai et al. |
| 2011/0038419 A1 | 2/2011 | Han et al. |
| 2011/0096835 A1 | 4/2011 | Lim et al. |
| 2011/0170602 A1 | 7/2011 | Lee et al. |
| 2011/0176611 A1 | 7/2011 | Huang et al. |
| 2011/0255598 A1 | 10/2011 | Lin et al. |
| 2011/0255600 A1 | 10/2011 | Lin et al. |
| 2012/0008688 A1 | 1/2012 | Tsai et al. |
| 2012/0027097 A1 | 2/2012 | Lin et al. |
| 2012/0063514 A1 | 3/2012 | Lin et al. |
| 2012/0121015 A1 | 5/2012 | Yang |
| 2012/0128060 A1 | 5/2012 | Lin et al. |
| 2012/0147964 A1 | 6/2012 | Schlockermann et al. |
| 2012/0207220 A1 | 8/2012 | Kim et al. |
| 2012/0207221 A1 | 8/2012 | Aono et al. |
| 2012/0224643 A1 | 9/2012 | Wang et al. |
| 2012/0257674 A1 | 10/2012 | Macq |
| 2012/0269265 A1 | 10/2012 | Macq |
| 2012/0287999 A1 | 11/2012 | Li et al. |
| 2012/0328024 A1 | 12/2012 | Kondo et al. |
| 2013/0016788 A1 | 1/2013 | Oh |
| 2013/0107958 A1 | 5/2013 | Shimada et al. |
| 2013/0114722 A1 | 5/2013 | Koyama et al. |
| 2013/0156108 A1 | 6/2013 | Jeon et al. |
| 2013/0163672 A1 | 6/2013 | Jeon et al. |
| 2013/0177076 A1 | 7/2013 | Itani et al. |
| 2013/0188721 A1 | 7/2013 | Jeong et al. |
| 2013/0188722 A1 | 7/2013 | Jeon et al. |
| 2013/0195192 A1 | 8/2013 | Jeon et al. |
| 2013/0202045 A1 | 8/2013 | Jeon et al. |
| 2013/0202046 A1 | 8/2013 | Jeon et al. |
| 2013/0208800 A1 | 8/2013 | Jeon et al. |
| 2013/0208993 A1 | 8/2013 | Jeon et al. |
| 2013/0242048 A1 | 9/2013 | Yin et al. |
| 2013/0251034 A1 | 9/2013 | Kim et al. |
| 2013/0259125 A1 | 10/2013 | Kim et al. |
| 2013/0272375 A1 | 10/2013 | Yu |
| 2014/0064375 A1 | 3/2014 | Kondo et al. |
| 2014/0064376 A1 | 3/2014 | Kondo et al. |
| 2014/0072046 A1 | 3/2014 | Kondo et al. |
| 2014/0072047 A1 | 3/2014 | Kondo et al. |
| 2014/0105297 A1 | 4/2014 | Jeon et al. |
| 2015/0030077 A1 | 1/2015 | Jeon et al. |
| 2015/0030078 A1 | 1/2015 | Jeon et al. |
| 2015/0030079 A1 | 1/2015 | Jeon et al. |
| 2015/0030080 A1 | 1/2015 | Jeon et al. |
| 2015/0131724 A1 | 5/2015 | Lin et al. |
| 2015/0131736 A1 | 5/2015 | Kondo et al. |
| 2015/0172701 A1 | 6/2015 | Kondo et al. |

(56) References Cited

U.S. PATENT DOCUMENTS

| | | |
|---|---|---|
| 2015/0245032 A1 | 8/2015 | Itani et al. |
| 2015/0245035 A1 | 8/2015 | Itani et al. |
| 2015/0245057 A1 | 8/2015 | Itani et al. |
| 2015/0281725 A1 | 10/2015 | Itani et al. |
| 2016/0100185 A1 | 4/2016 | Kondo et al. |
| 2016/0112716 A1 | 4/2016 | Kondo et al. |
| 2016/0330440 A1 | 11/2016 | Abe et al. |
| 2016/0330441 A1 | 11/2016 | Abe et al. |
| 2017/0048544 A1 | 2/2017 | Kondo et al. |
| 2017/0048545 A1 | 2/2017 | Kondo et al. |
| 2017/0048546 A1 | 2/2017 | Kondo et al. |
| 2017/0048547 A1 | 2/2017 | Kondo et al. |
| 2017/0085907 A1 | 3/2017 | Kondo et al. |
| 2017/0180749 A1 | 6/2017 | Sugio |
| 2017/0264894 A1 | 9/2017 | Abe et al. |
| 2017/0302955 A1 | 10/2017 | Kondo et al. |
| 2017/0302956 A1 | 10/2017 | Kondo et al. |
| 2017/0302957 A1 | 10/2017 | Kondo et al. |
| 2017/0324976 A1 | 11/2017 | Kondo et al. |
| 2018/0124393 A1 | 5/2018 | Abe et al. |
| 2018/0376136 A1 | 12/2018 | Abe et al. |

FOREIGN PATENT DOCUMENTS

| | | |
|---|---|---|
| CN | 101557461 | 10/2009 |
| CN | 101641954 | 2/2010 |
| CN | 102223542 | 10/2011 |
| EP | 0 817 491 | 3/2002 |
| EP | 2009923 | 12/2008 |
| EP | 2 117 234 | 11/2009 |
| EP | 2 309 750 | 4/2011 |
| JP | 2009-522986 | 6/2009 |
| JP | 2009-536793 | 10/2009 |
| JP | 2009-296605 | 12/2009 |
| JP | 2011-010197 | 1/2011 |
| JP | 2011-509053 | 3/2011 |
| JP | 2011-193352 | 9/2011 |
| JP | 2013-59024 | 3/2013 |
| JP | 2013-98745 | 5/2013 |
| JP | 2013-102273 | 5/2013 |
| KR | 10-2008-0031519 | 4/2008 |
| RU | 2 360 375 | 6/2009 |
| RU | 2 368 095 | 9/2009 |
| TW | 201125369 | 7/2011 |
| TW | 201216717 | 4/2012 |
| WO | 2004/040915 | 5/2004 |
| WO | 2004/071099 | 8/2004 |
| WO | 2005/081541 | 9/2005 |
| WO | 2006/000504 | 1/2006 |
| WO | 2007/081926 | 7/2007 |
| WO | 2010/109904 | 9/2010 |
| WO | 2011/046008 | 4/2011 |
| WO | 2013/154673 | 10/2013 |

OTHER PUBLICATIONS

Extended European Search Report dated May 6, 2021 in European Patent Application No. 21151386.6.
Bross et al., "High efficiency video coding (HEVC) text specification draft 8", Joint Collaborative Team on Video Coding (JCT-VC) of ITU-T SG16 WP3 and ISO/IEC JTC1/SC29/WG11, 10th Meeting: Stockholm, SE, Jul. 11-20, 2012, JCTVC-J1003_d7, JCTVC-J1003 (version 8), pp. 29-30, 36-38, 60-65, 72-77,121-123.
Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F803_d5, Oct. 28, 2011, XP030229353.
ISO/IEC 14496-10 (MPEG-4 Part10: Advanced Video Coding), Oct. 1, 2004.
Viktor Wahadaniah et al., "AHG14/AHG15/non-CE9: Loss robustness issue in TMVP disabling", Joint Collaborative Team on Video Coding (JCT-VC) of ITU-T SG16 WP3 and ISO/IEC JTC1/SC29/WG11 8$^{th}$ Meeting: San Jose, CA, USA, Jan. 27, 2012, [JCTVC-H0570 (version 2, JCTVC-H0570_r1.doc)].
Bin Li et al., "High-level Syntax: Temporal Information Decoding Refresh", Joint Collaborative Team on Video Coding (JCT-VC) of ITU-T SG16 WP3 and ISO/IEC JTC1/SC29/WG11 6$^{th}$ Meeting: Torino, IT, Jul. 17, 2011, [JCTVC-F201].
Chong Soon Lim et al., "High-level Syntax: Proposed fix on signaling of TMVP disabling flag", Joint Collaborative Team on Video Coding (JCT-VC) of ITU-T SG 16 WP 3 and ISO/IEC JTC 1/SC 29/WG 11 9$^{th}$ Meeting: Geneva, CH, Apr. 28, 2012, [JCTVC-I0420].
Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d9, Ver. 10, 7th Meeting: Geneva, CH, Nov. 21-30, 2011.
Bin Li et al., "Constrained temporal motion vector prediction for error resilience", Joint Collaborative Team on Video Coding (JCT-VC) of ITU-T SG16 WP3 and ISO/IEC JTC1/SC29/WG11, 4$^{th}$ Meeting: Daegu, KR, Jan. 2011, [JCTVC-D139].
Jian-Liang Lin et al., "Syntax for AMVP Parsing Error Control", Joint Collaborative Team on Video Coding (JCT-VC) of ITU-T SG16 WP3 and ISO/IEC JTC1/SC29/WG11, 4$^{th}$ Meeting: Daegu, KR, Jan. 2011, [JCTVC-D126].
Bin Li et al., "High-level Syntax: Marking process for non-TMVP pictures", Joint Collaborative Team on Video Coding (JCT-VC) of ITU-T SG16 WP3 and ISO/IEC JTC1/SC29/WG11 7$^{th}$ Meeting: Geneva, CH, Nov. 22, 2011, [JCTVC-G398].
Bin Li et al., "An investigation on robust parsing", Joint Collaborative Team on Video Coding (JCT-VC) of ITU SG16 WP3 and ISO/IEC JTC1/SC29/WG11 5$^{th}$ Meeting: Geneva, CH, Mar. 2011, [JCTVC-E148].
International Search Report dated Apr. 9, 2013 in PCT Application No. PCT/JP2013/000150.
"Advanced Video Coding for Generic Audiovisual Services", ITU-T Recommendation H. 264, Mar. 2010.
International Search Report dated May 14, 2013 in PCT Application No. PCT/JP2013/001198.
Viktor Wahadaniah, "AHG14/AHG15/non-CE9: Loss robustness issue in TMVP disabling", Joint Collaborative Team on Video Coding (JCT-VC) of ITU-T SG16 WP3 and ISO-IEC JTC1/SC29/WG11 JCTVC-H0570_r2, ITU-T, Feb. 8, 2012, p. 1-4.
Benjamin Bross et al., "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003, Ver. 20, 7th Meeting: Geneva, CH, Nov. 21-30, 2011.
Written Opinion of the International Searching Authority dated Apr. 9, 2013 in corresponding International Application No. PCT/JP2013/000465.
International Search Report dated Apr. 9, 2013 in corresponding International Application No. PCT/JP2013/000465.
Iain E. G. Richardson, "H.264 and MPEG-4 Video Compression", Dec. 19, 2003, John Wiley & Sons, Chapter 6, pp. 1-66.
Office Action dated May 15, 2014 in U.S. Appl. No. 13/924,965.
Bin Li et al., "High-level Syntax: Marking process for non-TMVP pictures", Joint Collaborative Team on Video Coding (JCT-VC) of ITU-T SG16 WP3 and ISO/IEC JTC1/SC29/WG11, JCTVC-G398_r1, 7th Meeting: Geneva, CH, Nov. 21-30, 2011.
Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d6, 7$^{th}$ Meeting: Geneva, CH, Nov. 21-30, 2011.
Extended European Search Report dated May 4, 2015 in European Application No. 13738409.5.
Alexis Michael Tourapis et al., "Direct Mode Coding for Bipredictive Slices in the H.264 Standard", IEEE Transactions on Circuits and Systems for Video Technology, vol. 15, No. 1, Jan. 1, 2005, XP011124673.
Bin Li et al., "Constrained temporal motion vector prediction for error resilience", Joint Collaborative Team on Video Coding (JCT-VC) of ITU-T SG16 WP3 and ISO/IEC JTC1/SC29/WG11, JCTVC-D139, 4$^{th}$ Meeting: Daegu, KR, Jan. 20-28, 2011, XP030008179.

(56) References Cited

OTHER PUBLICATIONS

Jian-Liang et al., "Parsing Error Control for Advanced Motion Vector Prediction", Joint Collaborative Team on Video Coding (JCT-VC) of ITU-T SG16 WP3 and ISO/IEC JTC1/SC29/WG11, JCTVC-D126, 4$^{th}$ Meeting: Daegu, KR, Jan. 20-28, 2011, XP030008166.

Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d0, 7$^{th}$ Meeting: Geneva, CH, Nov. 21-30, 2011, XP030111032.

A. Tamhankar et al., "An Overview of H.264/MPEG-4 Part 10", EC-VIP-MC 2003, 4$^{th}$ EURASIP Conference focused on Video/Image Processing and Multimedia Communications, Jul. 2-5, 2003, Zagreb, Croatia, pp. 1-51.

H.264/AVC Textbook, Impress standard textbook series, First Edition, First Issue, Aug. 11, 2004, pp. 124-127, with partial English language translation.

Extended European Search Report dated Jan. 18, 2016 in European Application No. 13757485.1.

Tammy Lee et al., "Syntax cleanup", Joint Collaborative Team on Video Coding (JCT-VC) of ITU-T SG16 WP3 and ISO/IEC JTC1/SC29/WG11, JCTVC-I0127, 9$^{th}$ Meeting: Geneva, CH, Apr. 27-May 7, 2012, XP030111890.

Yue Yu et al., "Modifications on signaling collocated picture", Joint Collaborative Team on Video Coding (JCT-VC) of ITU-T SG16 WP3 and ISO/IEC JTC1/SC29/WG11, JCTVC-I0266, 9$^{th}$ Meeting: Geneva, CH, Apr. 27-May 7, 2012, XP030112029.

Bin Li et al., "High-level Syntax: Marking process for non-TMVP pictures", Joint Collaborative Team on Video Coding (JCT-VC) of ITU-T SG16 WP3 and ISO/IEC JTC1/SC29/WG11, JCTVC-G398, 7$^{th}$ Meeting: Geneva, CH, Nov. 21-30, 2011, XP030110382.

Sang-Heon Lee et al., "Disparity vector prediction methods in MVC", Joint Video Team (JVT) of ISO/IEC MPEG & ITU-T VCEG (ISO/IEC JTC1/SC29/WG11 and ITU-T SG16 Q.6), JVT-U040r1, 21$^{st}$ Meeting: Hangzhou, China, Oct. 20-27, 2006, XP07913064.

Office Action dated Apr. 13, 2016 in Taiwanese Patent Application No. 102103739, with English translation of Search Report.

Extended European Search Report dated May 4, 2016 in European Application No. 13743026.0.

Office Action dated May 5, 2016 in U.S. Appl. No. 14/372,377.

Notice of Allowance dated Nov. 14, 2016 in U.S. Appl. No. 13/924,965.

Decision on grant dated Jan. 13, 2017 in Russian patent application No. 2013137410 with English translation.

ISO/IEC; ISO/IEC 14496-10 Second Edition, 2004, ISO/IEC, 2$^{nd}$ Ed.

Office Action and Search Report dated Mar. 3, 2017 in Chinese Patent Application No. 201380000667.5, with English translation of the Search Report.

Notice of Allowance dated Sep. 13, 2017 in U.S. Appl. No. 15/471,097.

Office Action dated Feb. 15, 2018 in U.S. Appl. No. 15/373,856.

Office Action dated Feb. 9, 2018 in U.S. Appl. No. 15/260,529.

Office Action dated Mar. 29, 2019 in Indian Patent Application No. 6462/CHENP/2013.

Office Action dated Mar. 14, 2019 in European Patent Application No. 13757485.1.

Office Action dated May 3, 2019 in U.S. Appl. No. 16/233,470.

Communication pursuant to Article 94(3) EPC dated Nov. 11, 2019 in European Patent Application No. 13743026.0.

Office Action dated Feb. 3, 2020 in European Patent Application No. 13 743 026.0.

Office Action dated May 7, 2020 in European Patent Application No. 13 743 026.0.

Lin et al., "AhG Parsing Robustness: Constrained Usage of Temporal MV and MVP Candidates," Joint Collaborative Team on Video Coding (JCT-VC) of ITU-T SG16 WP3 and ISO/IEC JTC1/SC29/WG11 5th Meeting: Geneva, CH, Mar. 16-23, 2011, [JCTVC-E050], ITU-T pp. 1-6.

Bross et al., "High efficiency video coding (HEVC) text specification draft 8," Joint Collaborative team on Video Coding (JCT-VC) of ITU-T SG16 WP3 and ISO/IEC JTC1/SC29/WG11 10th Meeting: Stockholm, SE, Jul. 11-20, 2012, [JCTVC-J1003_d7], JCTVC-J1003 (version 8), pp. 29-30, 36-38, 64, and 74-75.

Office Action issued for Indian Patent Application No. 6547/CHENP/2014 dated Aug. 4, 2020.

Benjamin Bross et al., "High efficiency video coding (HEVC) text specification draft 8", Joint Collaborative Team on Video Coding (JCT-VC) of ITU-T SG16 WP3 and ISO/IEC JTC1/SC29/WG11, 10th Meeting: Stockholm, SE, Jul. 11-20, 2012, [JCTVC-J1003_d7], JCTVC-J1003 (version 8), pp. 29-30, 36-38, 46, 60-65, 72-77, 121-123.

Decision to refuse issued for European Patent Application No. 13757485.1 dated May 25, 2021.

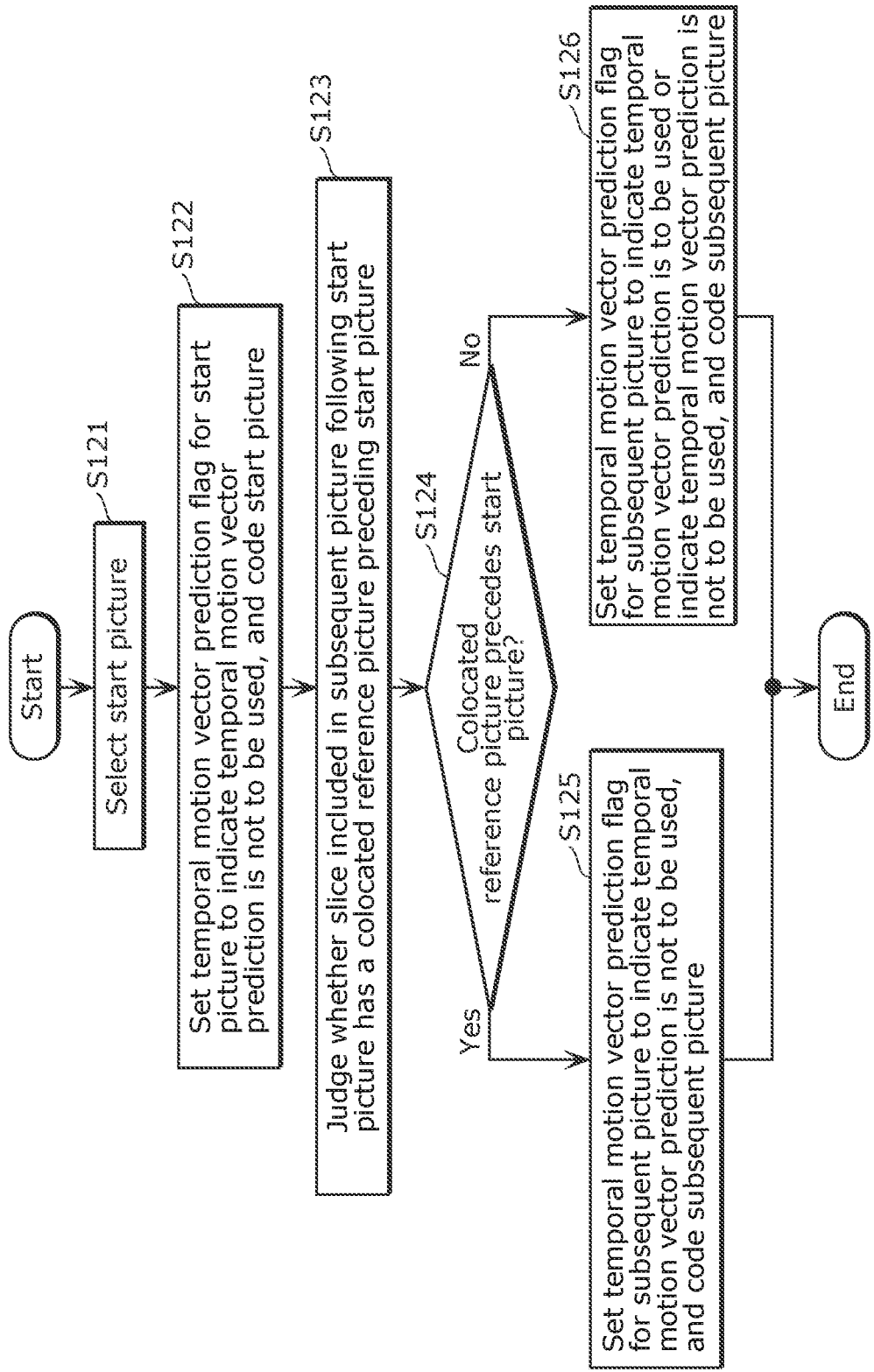

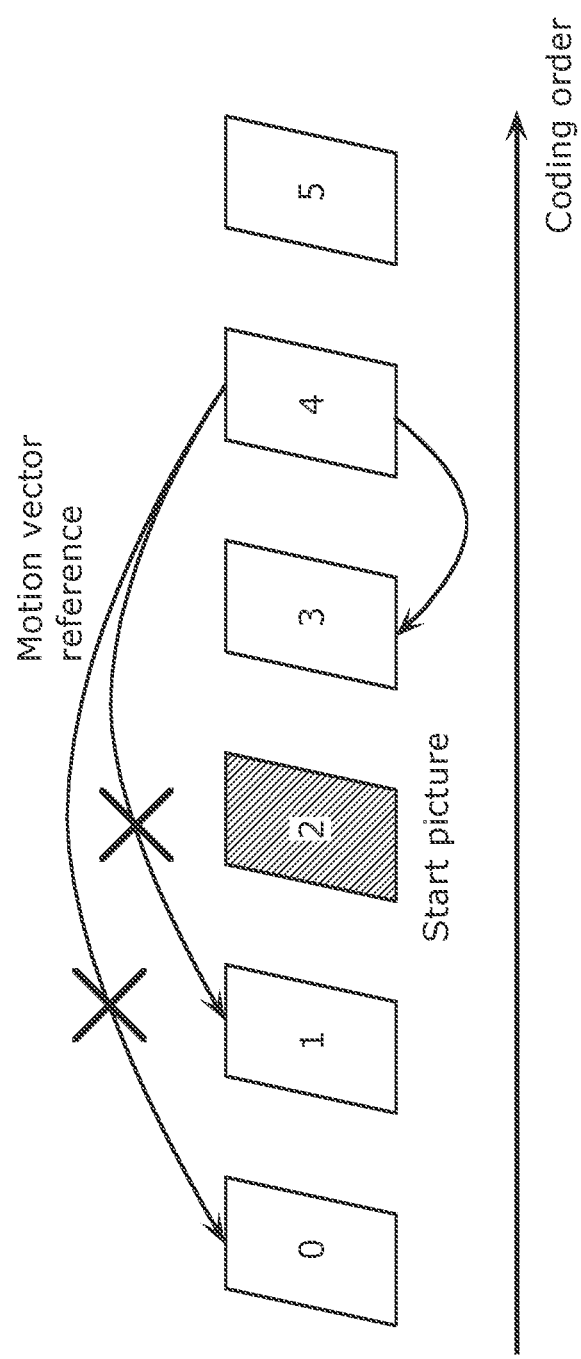

FIG. 16

Video stream (PID=0x1011, Primary video)

Audio stream (PID=0x1100)

Audio stream (PID=0x1101)

Presentation graphics stream (PID=0x1200)

Presentation graphics stream (PID=0x1201)

Interactive graphics stream (PID=0x1400)

Video stream (PID=0x1B00, Secondary video)

Video stream (PID=0x1B01, Secondary video)

FIG. 19
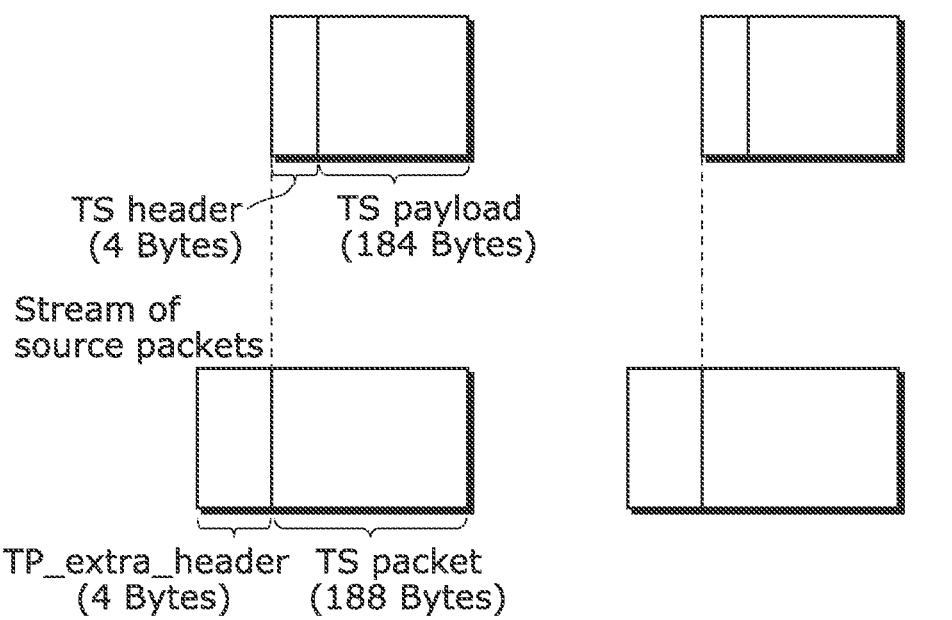
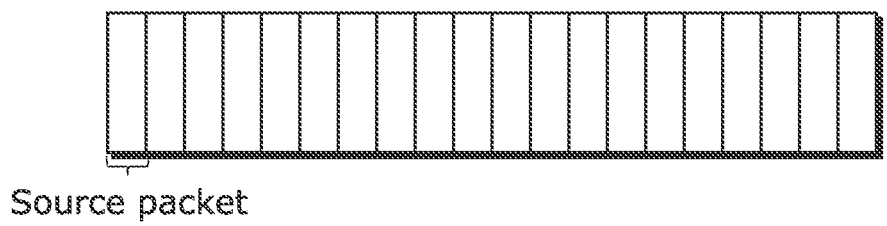

FIG. 27

| Corresponding standard | Driving frequency |
|---|---|
| MPEG-4 AVC | 500 MHz |
| MPEG-2 | 350 MHz |
| ⋮ | ⋮ |

IMAGE CODING METHOD AND IMAGE CODING APPARATUS

FIELD

The present disclosure relates to an image coding method and an image decoding method.

BACKGROUND

In state of the art coding schemes such as H.264/MPEG-4 AVC and the next-generation High-Efficiency Video Coding (HEVC), images and image content are coded or decoded using inter prediction which makes use of a previously coded or decoded reference picture. In this manner, in these image coding schemes, information redundancy across temporally consecutive pictures is exploited (for example, see Non Patent Literature (NPL) 1).

CITATION LIST

Non Patent Literature

[NPL 1] ISO/IEC 14496-10 "MPEG-4 Part 10 Advanced Video Coding"

SUMMARY

Technical Problem

Improvement of robustness is desired from such an image coding method and image decoding method.

One non-limiting and exemplary embodiment provides an image coding method and an image decoding method that are capable of improving robustness.

Solution to Problem

In order to achieve the aforementioned object, an image coding method according to an aspect of the present disclosure includes: (A) selecting a first picture from plural pictures; (B) setting a first temporal motion vector prediction flag which is associated with the first picture and is a temporal motion vector prediction flag indicating whether or not temporal motion vector prediction is to be used, to indicate that the temporal motion vector prediction is not to be used, and coding the first temporal motion vector prediction flag; (C) coding the first picture without using the temporal motion vector prediction; and (D) coding a second picture which follows the first picture in coding order, with referring to a motion vector of a picture preceding the first picture in coding order being prohibited.

It should be noted that general and specific aspects described above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The present disclosure can provide an image coding method and an image decoding method which are capable of improving robustness.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a flowchart of the image coding method according to Embodiment 1.

FIG. 4B is a diagram for describing the image coding method according to Embodiment 1.

FIG. 16 is a diagram showing a structure of multiplexed data.

FIG. 19 is a diagram showing a structure of TS packets and source packets in the multiplexed data.

FIG. 27 is a diagram showing an example of a look-up table in which video data standards are associated with driving frequencies.

Figure 1:
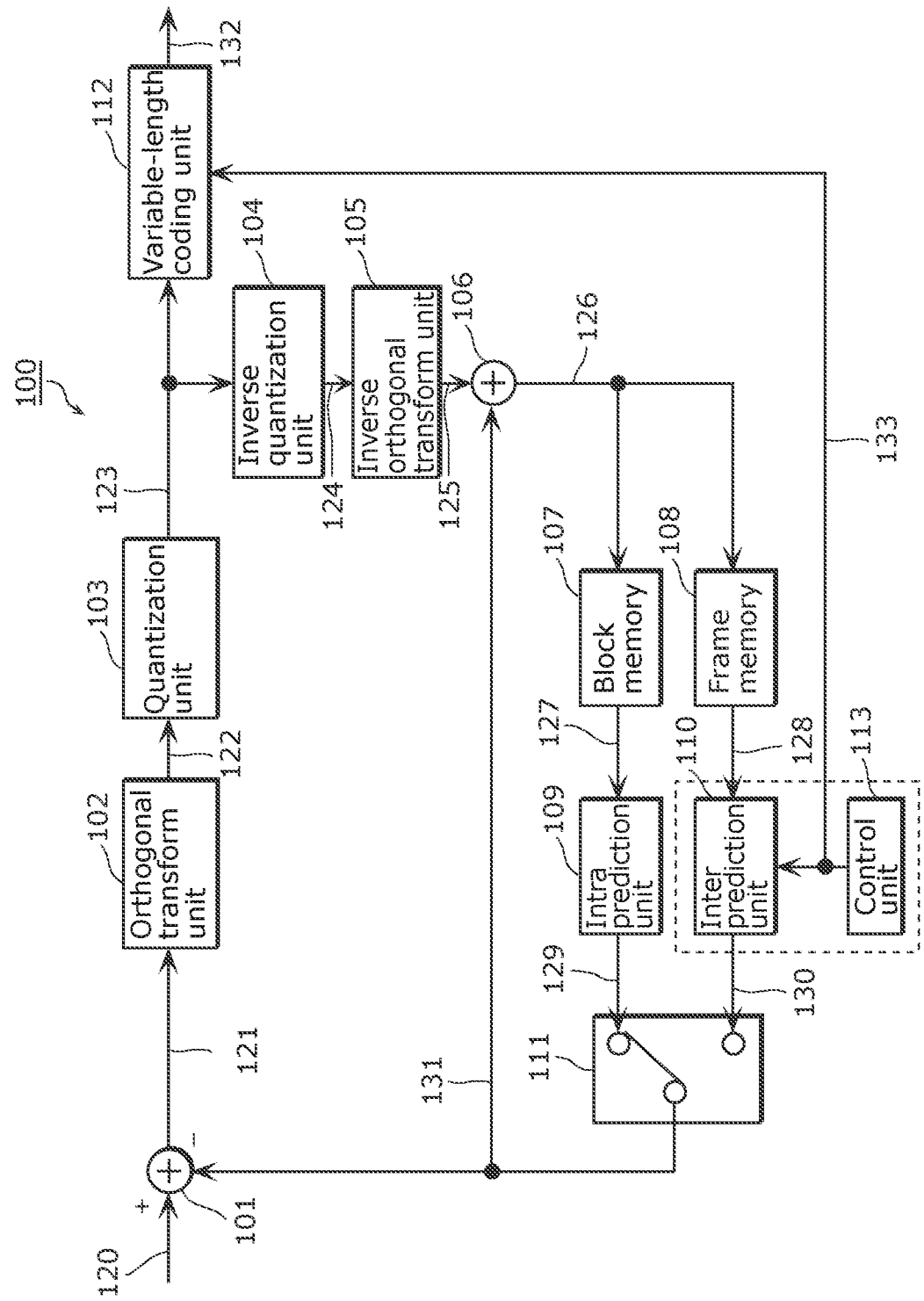
FIG. 1 is a block diagram of an image coding apparatus according to Embodiment 1.

DESCRIPTION OF EMBODIMENTS (Underlying Knowledge Forming Basis of the Present Disclosure)

The inventors have observed the occurrence of the following problems in relation to the prior art.

An image decoding apparatus identifies a reference picture used in the inter prediction of a prediction unit (a M×N sample block, etc.), by using a reference index. The reference index is an index that is assigned to each of one or more reference pictures included in a reference picture list. Furthermore, the reference picture list is an ordered list indicating one or more reference pictures. Furthermore, the reference index is uniquely associated with a reference picture in the decoded picture buffer (DPB).

In the state of the art image coding schemes, temporal prediction of motion vectors is performed. The motion vectors of a target sample block are predicted from motion vectors of one or more previously coded sample blocks included in a co-located reference picture. The co-located reference picture is selected from among available reference pictures by using a predetermined scheme. For example, the first reference picture is selected, as the co-located reference picture, from among reference pictures included in a predetermined reference picture list (such as the reference picture list 0).

In applications requiring transmission of images using irreversible compression, temporal motion vector prediction is susceptible to erroneous prediction of motion vector when the co-located reference picture is lost or contains errors. In the conventional HEVC image coding scheme, a marking flag is introduced in a picture parameter set (PPS) to mark all pictures included in the decoder picture buffer (DPB) as "unused for temporal motion vector prediction". This marking process is performed when a slice refers to a PPS having a marking flag indicating "TRUE". The inventors have observed that, in this scheme, there is the problem that when the slice on which marking is to be performed is lost or contains error, a video decoder cannot perform the intended marking process and subsequent synchronization between encoder and decoder. As such, the aforementioned scheme for disabling temporal motion vector prediction is not robust.

In the embodiments, methods that improve error robustness in an image coding method and an image decoding method that disable temporal motion vector prediction shall be described. The image coding method and image decoding method according to the embodiments can eliminate the process of marking reference pictures as "unused for temporal motion vector prediction", thereby eliminating the error susceptibility in the aforementioned scheme. The advantageous effect of the embodiments is improving error robustness of temporal motion vector prediction.

An image coding method according to an aspect of the embodiments includes: (A) selecting a first picture from plural pictures; (B) setting a first temporal motion vector prediction flag which is associated with the first picture and is a temporal motion vector prediction flag indicating whether or not temporal motion vector prediction is to be used, to indicate that the temporal motion vector prediction is not to be used, and coding the first temporal motion vector prediction flag; (C) coding the first picture without using the temporal motion vector prediction; and (D) coding a second picture which follows the first picture in coding order, with referring to a motion vector of a picture preceding the first picture in coding order being prohibited.

Accordingly, the second picture following the first picture is prohibited from referring to a motion vector of a picture preceding the first picture. Accordingly, the image coding method is capable of preventing the propagation of error across the first picture, and is thus capable of improving robustness.

For example, a temporal level may be set to each of the pictures, and, in step (A), a picture having a highest temporal level may be selected as the first picture, from among the pictures.

Accordingly, a picture having a high priority is set as the first picture. This can more appropriately prevent error propagation.

For example, step (D) may include: (D1) judging whether or not the second picture has a co-located reference picture which precedes the first picture in coding order; (D2) when the second picture has a co-located reference picture which precedes the first picture in coding order: (i) setting a second temporal motion vector prediction flag, which is a temporal motion vector prediction flag associated with the second picture, to indicate that the temporal motion vector prediction is not to be used; (ii) coding the second temporal motion vector prediction flag; and (iii) coding the second picture without using the temporal motion vector prediction; and (D3) when the second picture does not have a co-located reference picture which precedes the first picture in coding order: (i) setting the second temporal motion vector prediction flag to indicate that the temporal motion vector prediction is to be used or indicate that the temporal motion vector prediction is not to be used; (ii) coding the second temporal motion vector prediction flag; and (iii) coding the second picture using or without using the temporal motion vector prediction.

For example, step (D) may include: (D1) judging whether or not the second picture precedes the first picture in display order; (D2) judging whether or not the second picture has a co-located reference picture which precedes the first picture in coding order or in display order; (D3) when the second picture follows the first picture in display order and has a co-located reference picture which precedes the first picture in coding order or display order: (i) setting a second temporal motion vector prediction flag, which is a temporal motion vector prediction flag associated with the second picture, to indicate that the temporal motion vector prediction is not to be used; (ii) coding the second temporal motion vector prediction flag; and (iii) coding the second picture without using the temporal motion vector prediction; and (D4) when the second picture precedes the first picture in display order, or when the second picture follows the first picture in display order and has a co-located reference picture which precedes the first picture in coding order or display order: (i) setting the second temporal motion vector prediction flag, which is the temporal motion vector prediction flag associated with the second picture, to indicate that the temporal motion vector prediction is not to be used; (ii) coding the second temporal motion vector prediction flag; and (iii) coding the second picture without using the temporal motion vector prediction.

For example, in step (B), the first temporal motion vector prediction flag indicating that the temporal motion vector prediction is not to be used may be written into a header for each slice included in the first picture.

Accordingly, the first picture can be set by using, on a slice basis, a flag indicating whether or not temporal motion vector prediction is to be used. With this, improvement of robustness can be realized while suppressing an increase in the amount of data of the coded bit stream.

For example, the image coding method may further include: (E) creating a first list indicating plural motion vector predictors that include a temporal motion vector predictor derived from a motion vector of a co-located reference picture, when the temporal motion vector prediction flag indicates that the temporal motion vector prediction is to be used; and (F) creating a second list indicating plural motion vector predictors that do not include the temporal motion vector predictor, when the temporal motion vector prediction flag indicates that the temporal motion vector prediction is not to be used.

Accordingly, the amount of data when temporal motion vector prediction is not to be used can be reduced.

Furthermore, an image decoding method according to an aspect of the embodiments includes: (A) obtaining, from a bitstream, a first temporal motion vector prediction flag, which is a temporal motion vector prediction flag indicating whether or not temporal motion vector prediction is to be used, indicating that temporal motion vector prediction is not to be used on a first picture; (B) decoding the first picture without using the temporal motion vector prediction; and (C) decoding a second picture which follows the first picture in decoding order, with referring to a motion vector of a picture preceding the first picture in decoding order being prohibited.

Accordingly, the second picture following the first picture is prohibited from referring to a motion vector of a picture preceding the first picture. Accordingly, the image decoding method is capable of preventing the propagation of error across the first picture, and is thus capable of improving robustness.

For example, a temporal level may be set to each of plural pictures, and the first picture may be a picture having a highest temporal level among the pictures.

Accordingly, a picture having a high priority is set as the first picture. This can more appropriately prevent error propagation.

For example, in step (A), the first temporal motion vector prediction flag indicating that the temporal motion vector prediction is not to be used may be obtained from a header of each slice included in the first picture.

Accordingly, the first picture can be set by using, on a slice basis, a flag indicating whether or not temporal motion vector prediction is to be used. With this, improvement of robustness can be realized while suppressing an increase in the amount of data of the coded bit stream.

For example, the image decoding method may further include: (D) creating a first list indicating plural motion vector predictors that include a temporal motion vector predictor derived from a motion vector of a co-located reference picture, when the temporal motion vector prediction flag indicates that the temporal motion vector prediction is to be used; and (E) creating a second list indicating plural motion vector predictors that do not include the temporal motion vector predictor, when the temporal motion vector prediction flag indicates that the temporal motion vector prediction is not to be used.

Accordingly, the amount of data when temporal motion vector prediction is not to be used can be reduced.

Furthermore, an image coding apparatus according to an aspect of the embodiments includes: a setting unit configured to select a first picture from plural pictures and set a first temporal motion vector prediction flag which is associated with the first picture and is a temporal motion vector prediction flag indicating whether or not temporal motion vector prediction is to be used, to indicate that the temporal motion vector prediction is not to be used; and a coding unit configured to (i) code the first temporal motion vector prediction flag, (ii) code the first picture without using the temporal motion vector prediction, and (iii) code a second picture which follows the first picture in coding order, with referring to a motion vector of a picture preceding the first picture in coding order being prohibited.

According to this configuration, the second picture following the first picture is prohibited from referring to a motion vector of a picture preceding the first picture. Accordingly, the image coding apparatus is capable of preventing the propagation of error across the first picture, and is thus capable of improving robustness.

Furthermore, an image decoding apparatus according to an aspect of the embodiments includes: an obtaining unit configured to obtain, from a bitstream, a first temporal motion vector prediction flag, which is a temporal motion vector prediction flag indicating whether or not temporal motion vector prediction is to be used, indicating that temporal motion vector prediction is not to be used on a first picture; and a decoding unit configured to (i) decode the first picture without using the temporal motion vector prediction, and (ii) decode a second picture which follows the first picture in decoding order, with referring to a motion vector of a picture preceding the first picture in decoding order being prohibited.

According to this configuration, the second picture following the first picture is prohibited from referring to a motion vector of a picture preceding the first picture. Accordingly, the image decoding apparatus is capable of preventing the propagation of error across the first picture, and is thus capable of improving robustness.

Furthermore, an image coding and decoding apparatus according to an aspect of the embodiments may include the image coding apparatus and the image decoding apparatus.

It should be noted that general and specific aspects described above may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments of the present disclosure shall be described with reference to the Drawings.

It is to be noted that each of the embodiments described below shows a general or specific example. The numerical values, shapes, materials, structural elements, the arrangement and connection of the structural elements, steps, the processing order of the steps etc. shown in the following exemplary embodiments are mere examples. Therefore, among the structural elements in the following exemplary embodiments, structural elements not recited in any one of the independent claims defining the most generic concept are described as arbitrary structural elements.

Furthermore, in the subsequent description, there are cases where coding is used to mean encoding.

Embodiment 1

[Coding Apparatus]

First, a configuration of an image coding apparatus according to this embodiment shall be described. FIG. 1 is a block diagram showing a configuration of an image coding apparatus 100 according to this embodiment.

The image coding apparatus 100 shown in FIG. 1 codes an input image 120 (input image bitstream) on a block basis to generate a coded bitstream 132. The image coding apparatus 100 includes a subtractor 101, an orthogonal transform unit 102, a quantization unit 103, an inverse quantization unit 104, an inverse orthogonal transform unit 105, an adder 106, a block memory 107, a frame memory 108 (picture memory), an intra prediction unit 109, an inter prediction unit 110, a switching unit 111, a variable-length coding unit 112 (entropy coding unit), and a control unit 113.

The subtractor 101 subtracts a predicted image 131 from the input image 120 to generate a residual signal 121. The orthogonal transform unit 102 transforms the residual signal 121 into frequency coefficients to generate transform coefficients 122. The quantization unit 103 quantizes the transform coefficients 122 to generate quantized coefficients 123. The variable-length coding unit 112 performs variable-length coding (entropy coding) on the quantized coefficients 123 to generate the coded bitstream 132.

The inverse quantization unit 104 inverse-quantizes the quantized coefficients 123 to generate transform coefficients 124. The inverse orthogonal transform unit 105 performs inverse frequency transform on the transform coefficients 124 to generate a residual signal 125. The adder 106 adds the residual signal 125 to the predicted image 131 to generate a decoded image 126. The decoded image 126 is stored in the block memory 107 as an image signal 127, and stored in the frame memory 108 as an image signal 128. The image signals 127 and 128 are used in subsequent prediction processing.

The intra prediction unit 109 performs intra prediction using the image data 127 stored in the block memory 107, to generate a predicted image 129. For example, the intra prediction unit 109 detects, from processed image regions included in a processing target image, an image region that is most similar to a processing target image region. The inter prediction unit 110 performs inter prediction using the image signal 128 stored in the frame memory 108, to generate a predicted image 130. For example, the inter prediction unit 110 detects an image region included in another processed image and which is most similar to the processing target image region. The switching unit 111 selects one of the predicted images 129 and 130, and outputs the selected predicted image as the predicted image 131.

The control unit 113 judges whether or not to use temporal motion vector prediction for the inter prediction of the processing target slice, and outputs a temporal motion vector prediction flag 133 which is a signal indicating the judgment result to the inter prediction unit 110 and the variable-length coding unit 112. The inter prediction unit 110 performs inter prediction using or without using a temporal motion vector predictor, based on the judgment result. Furthermore, the variable-length coding unit 112 generates the coded bitstream 132 which includes the temporal motion vector prediction flag 133. Furthermore, temporal motion vector prediction is processing in which motion vector prediction is performed using a motion vector included in another picture, as a motion vector predictor.

[Coding Process]

Next, the operation of the above-described image coding apparatus 100 shall be described.

Figure 2:
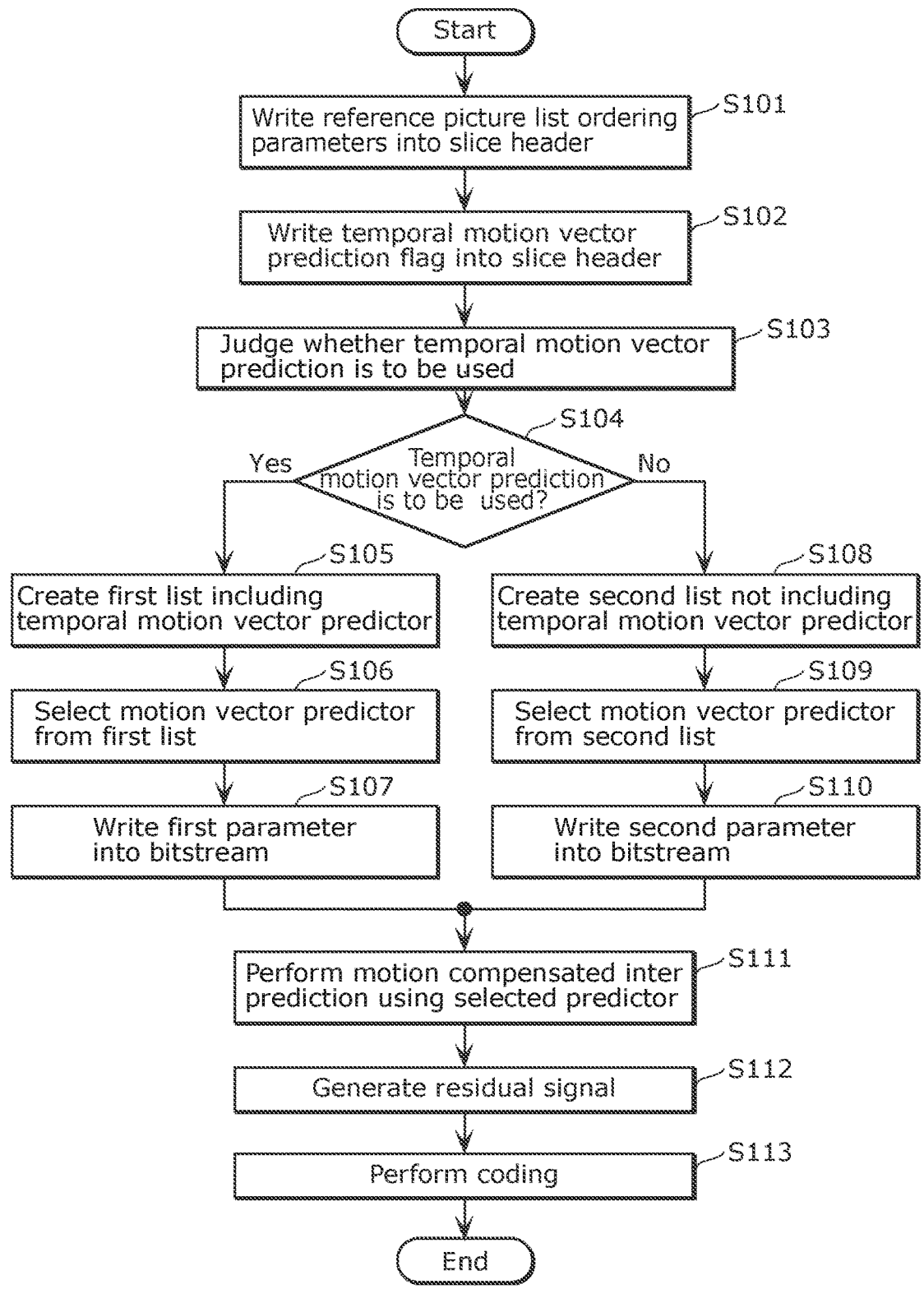
FIG. 2 is a flowchart of the image coding method according to Embodiment 1.

FIG. 2 is a flowchart of the image coding process according to this embodiment.

First, the image coding apparatus 100 writes plural reference picture list ordering parameters into a slice header of a slice to specify the order of reference pictures included in one or more reference picture lists and which are to be used for inter prediction of the slice (S101). Here, a reference picture (such as the first reference picture) in a predetermined location in a certain reference picture list (such as the reference picture list 0) indicates the co-located reference picture.

Next, the image coding apparatus 100 writes a temporal motion vector prediction flag indicating whether or not temporal motion vector prediction is to be used in the inter prediction of a slice, into the slice header (S102). Next, the image coding apparatus 100 judges whether the temporal motion vector prediction flag indicates that temporal motion vector prediction is to be used or is not to be used (S103). The value of the flag is, for example, "0" when temporal motion vector prediction is not to be used, and is "1" when temporal motion vector prediction is to be used.

When the flag indicates that temporal motion vector prediction is to be used (Yes in S104), the image coding apparatus 100 creates a first list of motion vector predictors that include at least one temporal motion vector predictor derived from a motion vector of the co-located reference picture (S105). Next, the image coding apparatus 100 selects, from the first list, a motion vector predictor for the processing target sample block included in the slice (S106). Next, the image coding apparatus 100 writes a first parameter (motion vector predictor selection parameter) indicating the selected motion vector predictor into the coded bitstream 132 (S107).

On the other hand, when the flag indicates that temporal motion vector prediction is not to be used (No in S104), the image coding apparatus 100 creates a second list of motion vector predictors that do not include the temporal motion vector predictor (S108). Next, the image coding apparatus 100 selects, from the second list, a motion vector predictor for the processing target sample block included in the slice (S109). Next, the image coding apparatus 100 writes a second parameter (motion vector predictor selection parameter) indicating the selected motion vector predictor into the coded bitstream 132 (S110).

After step S107 or S110, the image coding apparatus 100 performs motion compensated inter prediction using the motion vector predictor selected in step S106 or step S109 to thereby generate a predicted sample block (predicted image 131) (S111). Next, the image coding apparatus 100 subtracts the predicted sample block (predicted image 131) from the original sample block (input image 120) to thereby generate a residual sample block (residual signal 121) (S112). Then, the image coding apparatus 100 codes the residual sample block corresponding to the target block to thereby generate the coded bitstream 132 (S113).

Here, by way of the temporal motion vector prediction flag, a single slice is controlled independently of other slices. Furthermore, the image coding apparatus 100 does not perform marking on a reference picture in the DPB. Furthermore, in this embodiment, the value of the temporal motion vector prediction flag may be different for plural slices within the same picture.

Furthermore, in this embodiment, the number of motion vector predictors is different between the first list and second list of motion vector predictors, and the number of predictors in the second list is 1 less than that in the first list. Furthermore, in both lists, motion vector predictors other than the temporal motion vector predictors are the same. In the coded bitstream 132, different bit representations may be used for the first parameter and second parameter which represent the selected motion vector predictor. For example, truncated unary representation having different maximum values in the arithmetic coding binarization or in the variable length coding may be used.

It should be noted that the number of motion vector predictors in the first list and the second list may be the same. In this case, in place of the temporal motion vector prediction predictor, the second list includes a non-temporal motion vector predictor that is not present in the first list. The non-temporal motion vector predictor is temporally independent, that is, derived without using motion vectors from a reference picture. An example of the non-temporal motion vector predictor is a spatial motion vector predictor derived using one or more neighboring blocks in the same picture as the target block. It should be noted that the non-temporal motion vector predictor may be a zero motion vector predictor having horizontal motion vector components and vertical motion vector components equal to zero.

Hereinafter, another example of the coding process according to this Embodiment shall be described. FIG. 3 is a flowchart of a coding process for coding plural pictures, according to this embodiment.

First, the image coding apparatus 100 selects, from plural coding target pictures, a start picture for temporal motion vector prediction refresh (S121). Temporal motion vector prediction refresh means that propagation of motion vector prediction dependency is terminated at the start picture.

Here, the image coding apparatus 100 does not use pictures preceding the start picture for temporal motion vector prediction in the coding of all pictures following the start picture in coding order. Temporal motion vector prediction refresh provides, in the coded bitstream 132, recovery points at which reconstruction errors due to temporal motion vector prediction mismatch can be corrected. With this, error robustness is improved.

Next, the image coding apparatus 100 codes all the slices included in the start picture. Furthermore, the image coding apparatus 100 sets the temporal motion vector prediction flags of all slices included in the start picture to indicate that "temporal motion vector prediction is not to be used" (e.g., flag value "0") (S122). In other words, temporal motion vector prediction will not be used for all the slices included in the start picture.

Next, the image coding apparatus 100 judges whether or not a slice included in a subsequent picture which follows the start picture in coding order has a co-located reference picture that precedes the start picture in coding order (S123).

When the co-located reference picture of the slice included in the subsequent picture precedes the start picture (Yes in S124), the image coding apparatus 100 codes the slice included in the subsequent picture. At this time, the image coding apparatus 100 sets the temporal motion vector prediction flag for the slice of the subsequent picture to indicate that "temporal motion vector prediction is not to be used" (e.g., flag value "0") (S125). In other words, temporal motion vector prediction beyond the start picture in coding order is disabled.

On the other hand, when the co-located reference picture of the slice of the subsequent picture does not precede the start picture (i.e., the start picture or a picture which follows in coding order is the co-located reference picture) (No in S124), the image coding apparatus 100 codes the slice of the subsequent picture. At this time, the image coding apparatus 100 sets the temporal motion vector prediction flag for the slice of the subsequent picture to indicate that "temporal motion vector prediction is to be used" (e.g., flag value "1") or to indicate that "temporal motion vector prediction is not to be used" (e.g., flag value "0") (S126). In other words, when the co-located reference picture does not precede the start picture in coding order, there is the option of whether or not to use temporal motion vector prediction on the target slice. Furthermore, in this embodiment, the selection for whether or not to use temporal motion vector prediction is determined based on whether or not coding efficiency is maximized.

Figure 4A:
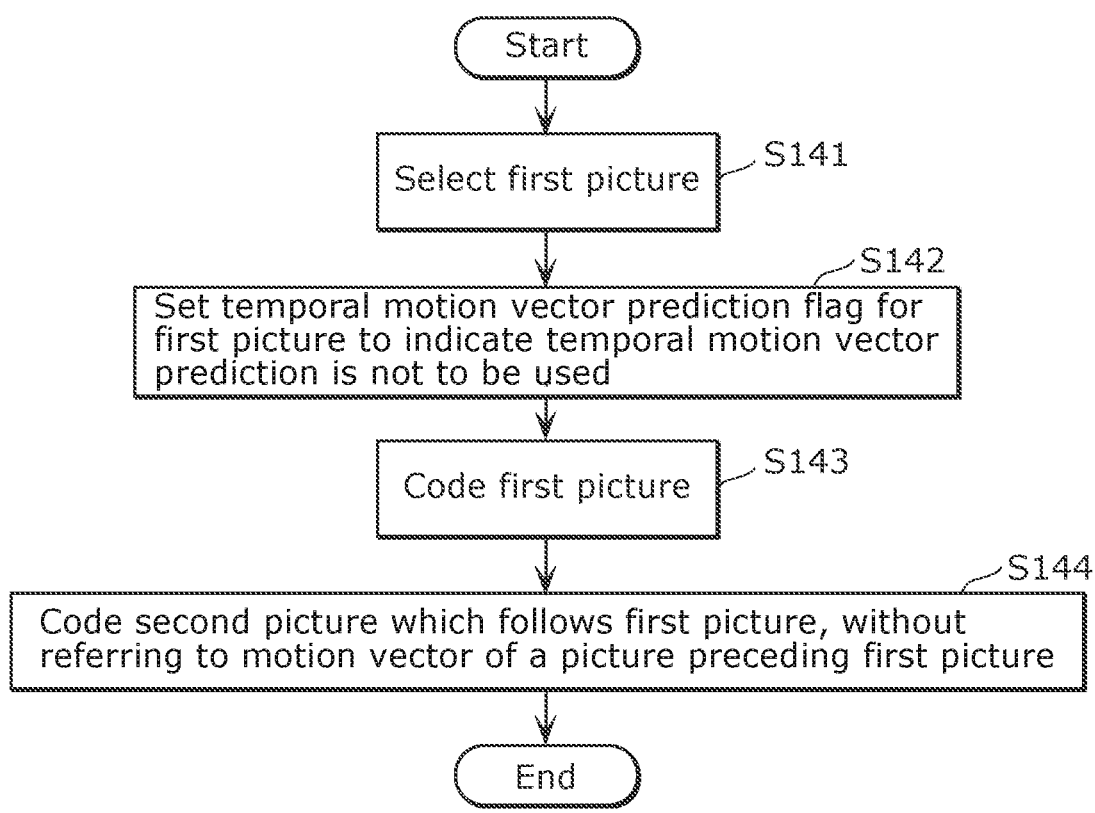
FIG. 4A is a flowchart of the image coding method according to Embodiment 1.

As described above, the image coding apparatus 100 selects the first picture (start picture) from among plural pictures, as shown in FIG. 4A (S141).

Next, the image coding apparatus 100 sets a first temporal motion vector prediction flag associated with the first picture to indicate that temporal motion vector prediction is not to be used, and codes the first temporal motion vector prediction flag (S142). Specifically, the image coding apparatus 100 writes the first temporal motion vector prediction flag indicating that temporal motion vector prediction is not to be used, into the headers of all of the slices included in the first picture.

Furthermore, the image coding apparatus 100 codes the first picture without using temporal motion vector prediction (S143).

Next, the image coding apparatus 100 codes a second picture which follows the first picture in coding order, with the referring to a motion vector of a picture preceding the first picture in coding order being prohibited (S144).

Accordingly, since the image coding apparatus 100 can prohibit the second picture following the first picture from referring to a motion vector of a picture preceding the first picture in coding order, it is possible to prevent the propagation of error across the first picture. Therefore, the image coding apparatus 100 is capable of improving robustness.

It should be noted that the order of step S142 and step S143 may be interchanged.

Figure 4C:
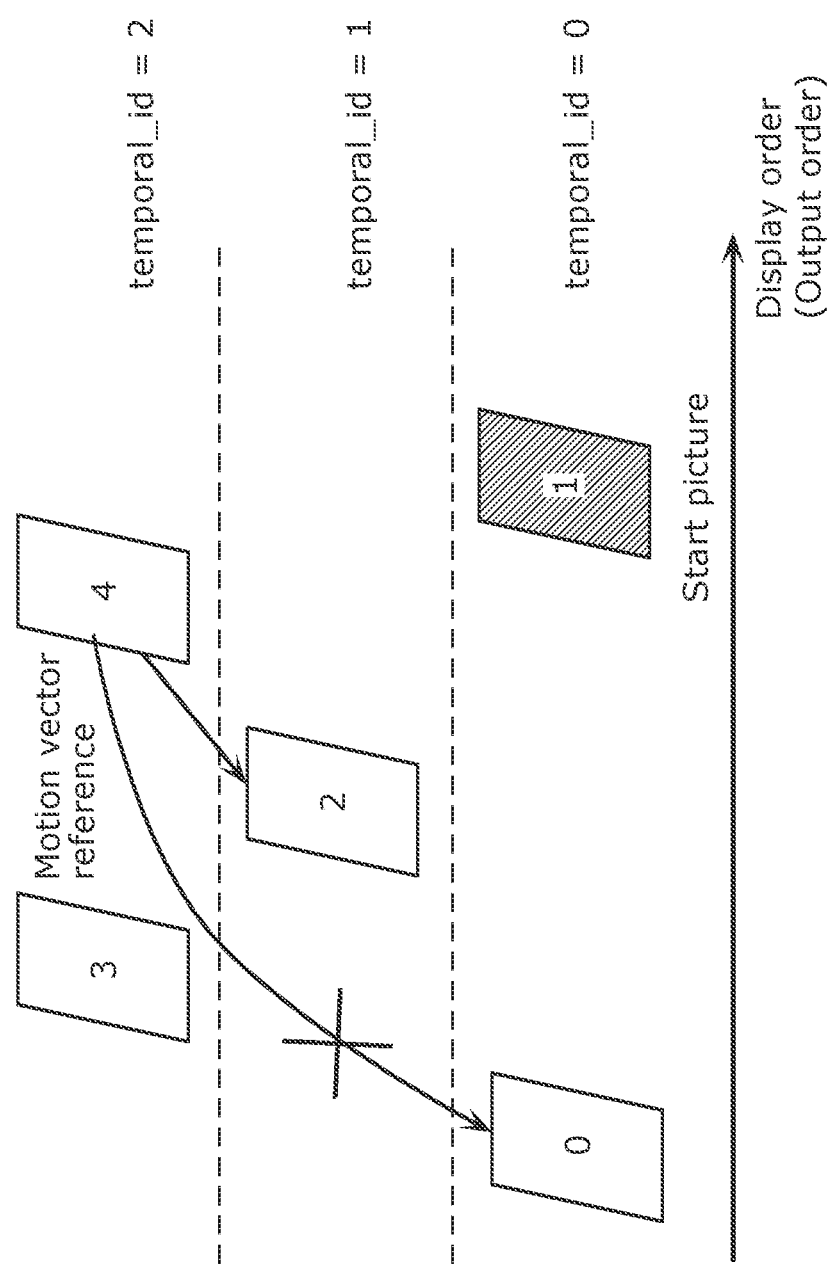
FIG. 4C is a diagram for describing the image coding method according to Embodiment 1.

For example, as shown in FIG. 4B, at the time when picture 4 is coded, referring to motion vectors of picture 0 and picture 1 which precede start picture 2 is prohibited. Furthermore, as shown in FIG. 4C, the same is true for the case when the coding order and display order (output order) are different. In the example shown in FIG. 4C, at the time when picture 4 is coded, referring to a motion vector of picture 0 which precedes the start picture is prohibited. It should be noted that in FIG. 4B and FIG. 4C, the picture numbers (picture 0, picture 1, . . . ) indicate the coding order.

Here, step S141 and part of S142 are executed by a setting unit included in the image coding apparatus 100. Furthermore, another part of the aforementioned step S142, and steps S143 and S144 are executed by a coding unit included in the image coding apparatus 100. For example, the setting unit is included in the control unit 113 shown in FIG. 1. Furthermore, the main function of the coding unit is realized by the inter prediction unit 110, the variable length coding unit 112, and the control unit 113 shown in FIG. 1.

Furthermore, although as a method of prohibiting the subsequent picture which follows the start picture from referring to a motion vector of a picture preceding the start picture, a method which does not use temporal motion vector prediction for the subsequent picture is illustrated here, other methods may be used.

For example, when the co-located reference picture of the subsequent picture precedes the start picture, the image coding apparatus 100 may change such co-located reference picture to the start picture or a picture following the start picture.

Furthermore, when the co-located reference picture of the subsequent picture precedes the start picture, the image coding apparatus 100 may create a list (the second list) of motion vector predictors that do not include a temporal motion vector predictor, instead of setting the temporal motion vector prediction flag to indicate that "temporal motion vector prediction is not to be used". Furthermore, even when creating a list of motion vector predictors that include a temporal motion vector predictor, the image coding apparatus 100 may, for example, perform coding without selecting the index assigned to the temporal motion vector predictor, so as not to select the temporal motion vector predictor.

Figure 5:
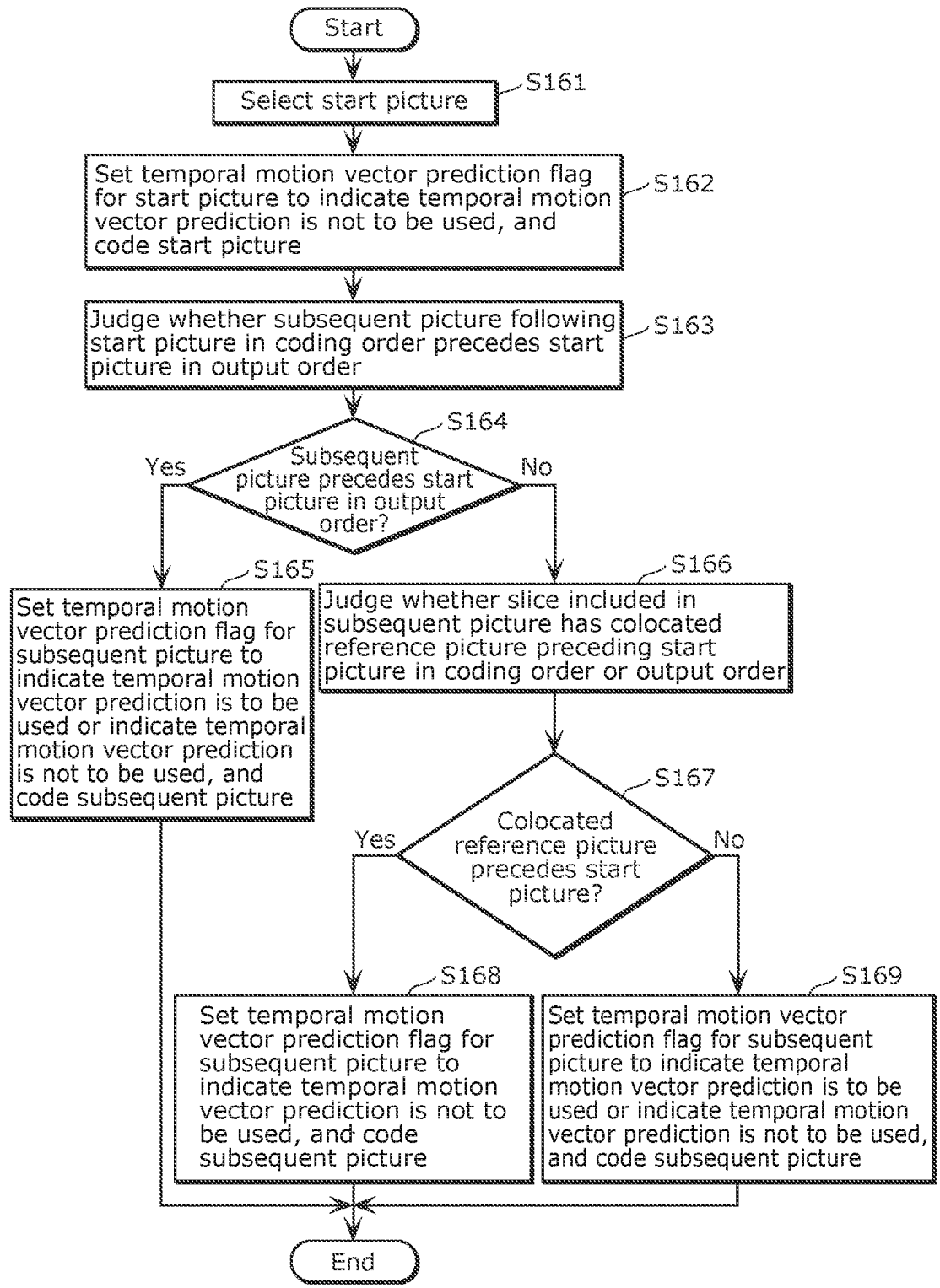
FIG. 5 is a flowchart of a modification of the image coding method according to Embodiment 1.

Hereinafter, a modification of the coding process according to this embodiment shall be described. FIG. 5 is a flowchart of a coding process for coding plural pictures, according to a modification of this embodiment.

The image coding apparatus 100 selects, from plural pictures, a start picture for temporal motion vector prediction refresh (S161). Then, the image coding apparatus 100 codes all the slices included in the start picture. Furthermore, the image coding apparatus 100 sets the temporal motion vector prediction flags of all the slices included in the start picture to indicate that "temporal motion vector prediction is not to be used" (S162).

Next, the image coding apparatus 100 judges whether or not a subsequent picture which follows the start picture in coding order precedes the start picture in output order (also commonly called display order) (S163).

When the subsequent picture precedes the start picture in output order (Yes in S164), the image coding apparatus 100 codes a slice of the subsequent picture. At this time, the image coding apparatus 100 sets the temporal motion vector prediction flag for the slice of the subsequent picture to indicate that "temporal motion vector prediction is to be used" (e.g., flag value "1") or to indicate that "temporal motion vector prediction is not to be used" (e.g., flag value "0") (S165). In other words, when the subsequent picture precedes the start picture in output order, there is the option of whether or not to use temporal motion vector prediction on the slice of the subsequent picture. In this embodiment, the selection for whether or not to use temporal motion vector prediction is determined based on whether or not coding efficiency is maximized.

On the other hand, when the subsequent picture does not precede the start picture in output order (i.e., follows the start picture in output order) (No in S164), the image coding apparatus 100 judges whether or not the slice included in the subsequent picture has a co-located reference picture that precedes the start picture in either coding order or output order (S166).

When the co-located reference picture of the slice included in the subsequent picture precedes the start picture in either the coding order or output order (Yes in S167), the image coding apparatus 100 codes the slice included in the subsequent picture. At this time, the image coding apparatus 100 sets the temporal motion vector prediction flag for the slice to indicate that "temporal motion vector prediction is not to be used" (e.g., flag value "0") (S168). In other words, temporal motion vector prediction beyond the start picture in either coding order or output order is disabled.

On the other hand, when the co-located reference picture of the slice included in the subsequent picture does not precede the start picture in either the coding order or output order (No in S167), the image coding apparatus 100 codes the slice included in the subsequent picture. At this time, the image coding apparatus 100 sets the temporal motion vector prediction flag for the slice to indicate that "temporal motion vector prediction is to be used" (e.g., flag value "1") or to indicate that "temporal motion vector prediction is not to be used" (e.g., flag value "0") (S169). In other words, when the co-located reference picture follows the start picture in coding order and output order, there is the option of whether or not to use temporal motion vector prediction on the target slice. In this embodiment, the selection for whether or not to use temporal motion vector prediction is determined based on whether or not coding efficiency is maximized.

Furthermore, in the example of the coding process describe above, normative restrictions are provided as shown below.

The temporal level of a start picture has the highest priority. An example of a temporal level having the highest priority is the temporal level 0 in HEVC video coding scheme, that is, a temporal_id in a Network Abstraction Layer (NAL) unit header of the slice is equal to 0.

Here, temporal level (temporal hierarchy) indicates that a picture (slice) having a certain temporal level can refer to information of a picture having the same temporal level or a higher temporal level. For example, a picture having the highest temporal level (temporal_id=0) is coded using only a picture having the highest temporal level. Stated differently, the picture having the highest temporal level (temporal_id=0) can be decoded using only a picture having the highest temporal level.

All slices included in a start picture shall not use temporal motion vector prediction (e.g., flag values set to 0). Therefore, a start picture is identified as a picture having the highest priority temporal level (e.g., temporal_id is 0) and the temporal motion vector prediction flag indicates "not to be used" (e.g., flag value is 0).

Any pictures following a start picture shall not use temporal motion vector prediction beyond the start picture as described in FIG. 3 (using coding order conditions) or FIG. 5 (using coding order and output order conditions).

Furthermore, the coded bitstream 132 conforms to the normative conditions.

An image decoding apparatus according to this embodiment can detect bitstream non-conformances (with respect to the normative restrictions) and arbitrarily perform error handling processes when such non-conformances are detected. For example, the image decoding apparatus may conceal a non-conformant block (or slice) by replacing the non-conformant block (or slice) with a co-located block (or slice) included in a prior reconstructed picture that precedes the decoding target picture and is nearest to the decoding target picture.

[Syntax]

Figure 6:
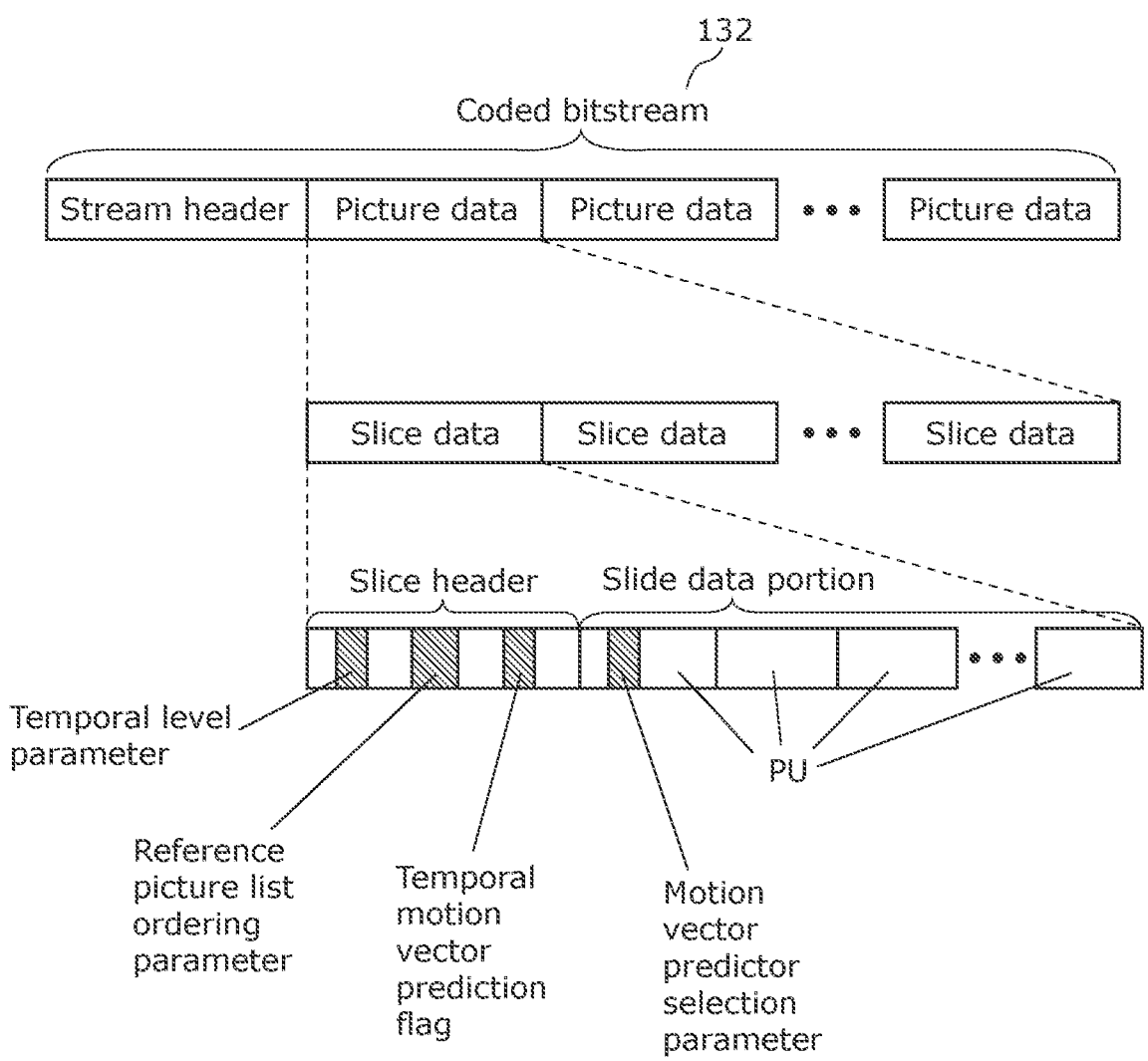
FIG. 6 is a diagram showing an exemplary configuration of a coded bitstream according to Embodiment 1.

FIG. 6 is a syntax diagram showing a location of the temporal motion vector prediction flag according to this embodiment.

As shown in FIG. 6, reference picture list ordering parameters for specifying the order of reference pictures in one or more reference picture lists are located in the slice header. These parameters determine the effective or final order of reference picture lists used for inter prediction of the slice corresponding to the slice header. Furthermore, these parameters may specify a reordering process to be performed on one or more initial reference picture lists, or may specify that the initial reference picture lists are to be used without reordering. Here, an initial reference picture list is a reference picture list created using a predetermined ordered scheme.

Furthermore, a temporal motion vector prediction flag is included in the slice header in the same manner as the reference picture list ordering parameters. The temporal motion vector prediction flag indicates whether or not temporal motion vector prediction is to be used for the slice corresponding to the slice header.

A motion vector predictor selection parameter is provided at each of prediction units. This motion vector predictor selection parameter indicates a single motion vector predictor selected in the inter prediction of a prediction unit, from among plural motion vector predictors available for inter prediction of the prediction unit.

A temporal level parameter is included in the slice header. As described above, the image coding apparatus 100 selects a start picture for temporal motion vector prediction refresh from among plural pictures, using this temporal level parameter. Specifically, the image coding apparatus 100 selects, as the start picture, a picture having the highest temporal level among plural pictures.

It should be noted that the reference picture list ordering parameters and the temporal motion vector prediction flag may be included in a header shared among plural slices included in the same picture. An example of such a header is an adaptation parameter set (APS) header.

Slice partitioning is one method for dividing a picture into multiple sub-picture partitions. Therefore, this embodiment may be applied when other sub-picture partitioning methods such as tile, entropy slice, or wavefront partitioning units are used. In other words, the parameters included in a slice header may be included in a header for a sub-picture unit.

[Advantageous Effect of Coding Invention]

Accordingly, the image coding apparatus 100 according to this embodiment is capable of improving error robustness of inter prediction using a temporal motion vector predictor. Furthermore, the image coding apparatus 100 is capable of improving coding efficiency and flexibility of inter prediction, as temporal motion vector predictors can be enabled and disabled independently in plural slices included in the same picture.

[Decoding Apparatus]

Hereinafter, an image decoding apparatus 200 according to this embodiment shall be described. The image decoding apparatus 200 decodes the coded bitstream 132 generated by the above-described image coding apparatus 100.

Figure 7:
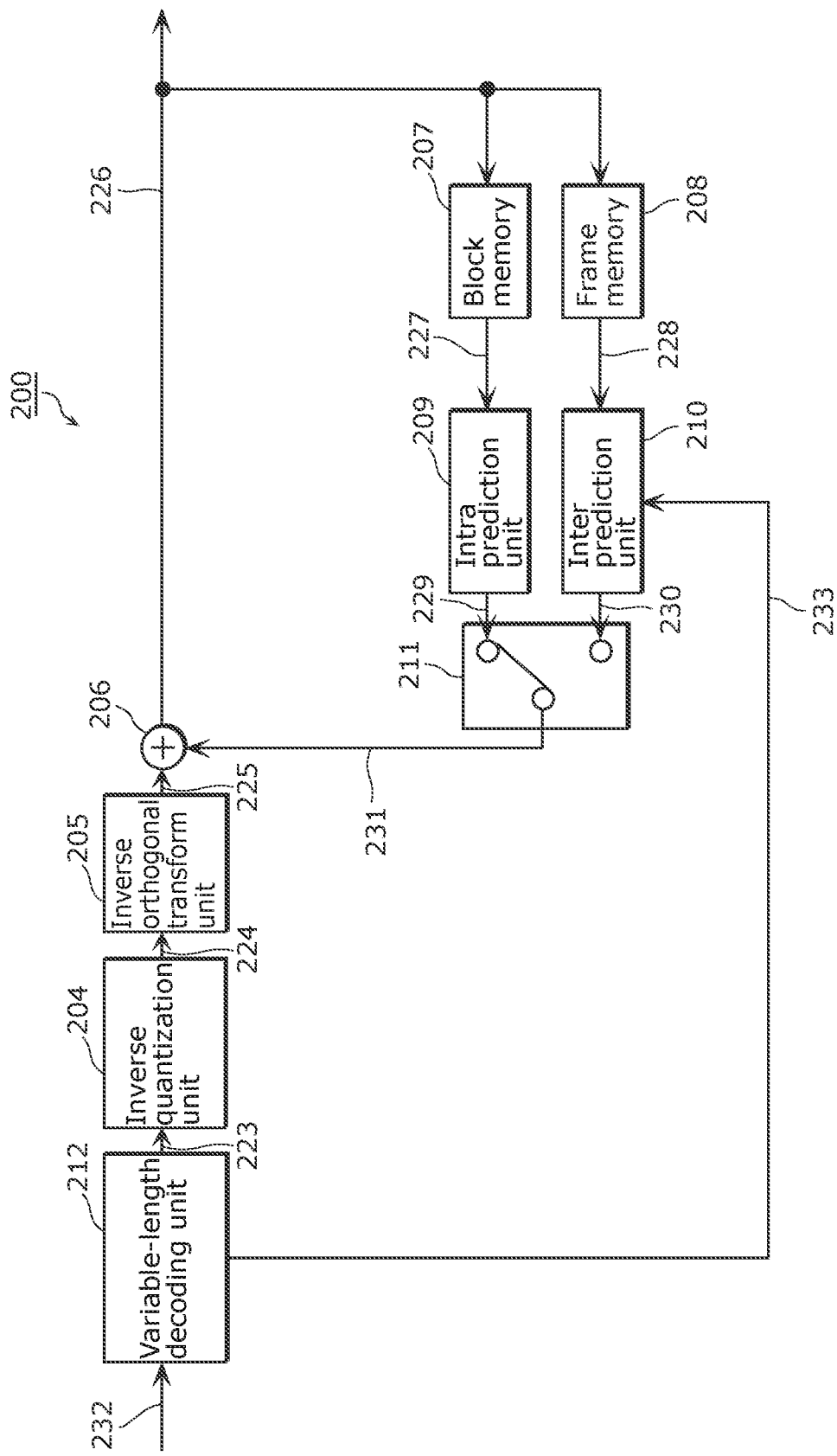
FIG. 7 is a block diagram of an image decoding apparatus according to Embodiment 1.

FIG. 7 is a block diagram showing a configuration of the image decoding apparatus 200 according to this embodiment.

The image decoding apparatus 200 decodes a coded bitstream 232 on a block basis to generate a decoded image 226. Here, the coded bitstream 232 is, for example, the coded bitstream 132 generated by the above-described image coding apparatus 100.

As shown in FIG. 7, the image decoding apparatus 200 includes a variable-length decoding unit 212 (entropy coding unit), an inverse quantization unit 204, an inverse orthogonal transform unit 205, an adder 206, a block memory 207, a frame memory 208 (picture memory), an intra prediction unit 209, an inter prediction unit 210, and a switching unit 211.

The variable-length decoding unit 212 performs variable-length decoding on the coded bitstream 232 to generate quantized coefficients 223. The inverse quantization unit 204 inverse-quantizes the quantized coefficients 223 to generate transform coefficients 224. The inverse orthogonal transform unit 205 performs inverse frequency transform on the transform coefficients 224 to generate a residual signal 225. The adder 206 adds up the residual signal 225 and a predicted image 231 to generate a decoded image 226. The decoded image 226 is, for example, outputted to a display unit. Furthermore, the decoded image 226 is stored in the block memory 207 and the frame memory 208, as image signals 227 and 228, respectively, for subsequent prediction.

The intra prediction unit 209 performs intra prediction using the image signal 227 stored in the block memory 207, to generate a predicted image 229. For example, the intra prediction unit 209 detects, from processed image regions included in a processing target image, an image region that is most similar to a processing target image region. The inter prediction unit 210 performs inter prediction using the image signal 228 stored in the frame memory 208, to generate a predicted image 230. For example, the inter prediction unit 210 detects an image region included in another processed image and which is most similar to the processing target image region. The switching unit 211 selects one of the predicted images 229 and 230, and outputs the selected predicted image as the predicted image 231.

Furthermore, the variable-length decoding unit 212 obtains, from the coded bitstream 232, a temporal motion vector prediction flag 233 indicating whether or not temporal motion vector prediction is to be used in the inter prediction for the decoding target slice. The inter prediction unit 210 performs inter prediction using or without using a temporal motion vector predictor, based on this flag.

[Decoding Process]

Figure 8:
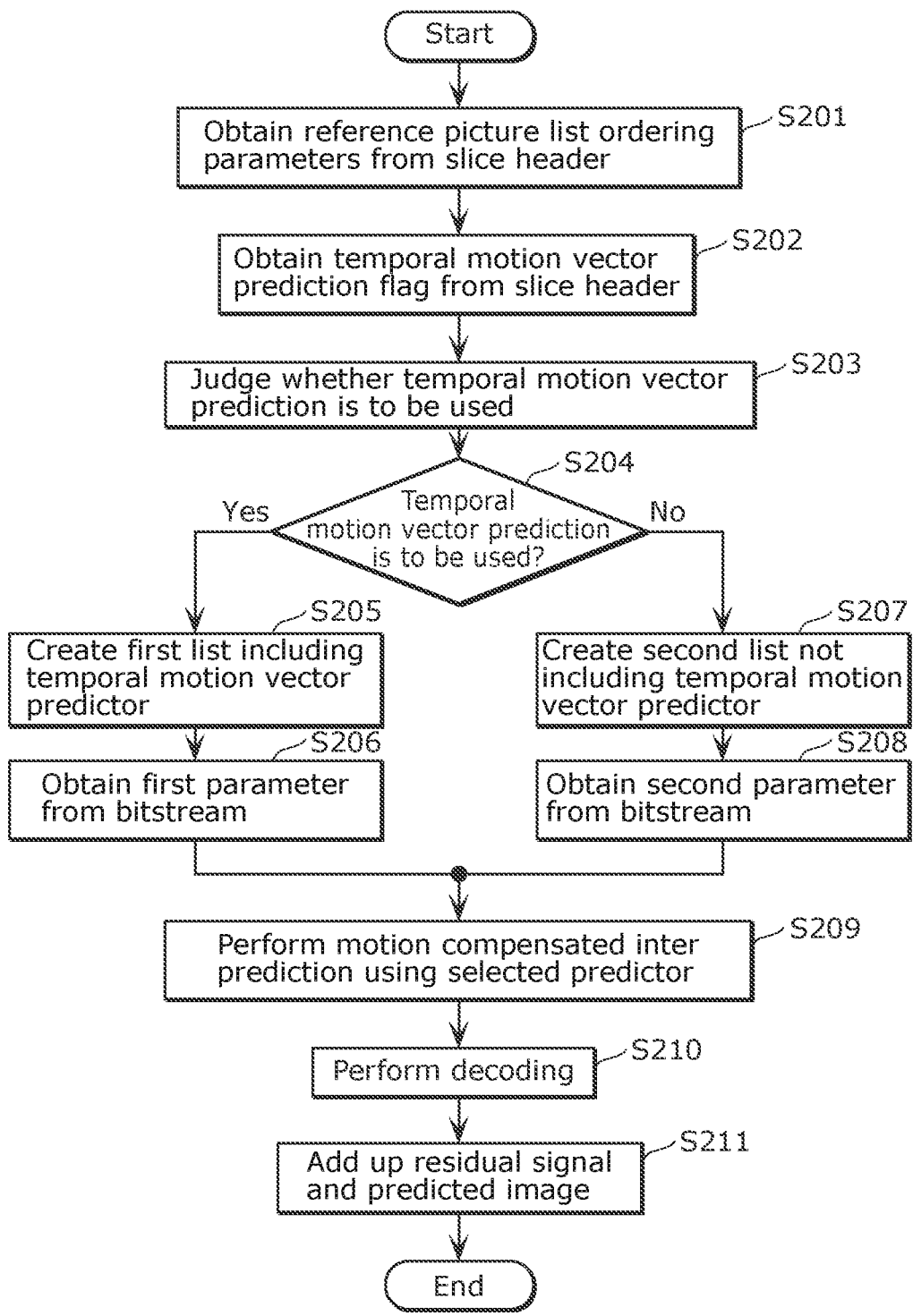
FIG. 8 is a flowchart of an image decoding method according to Embodiment 1.
Figure 9:
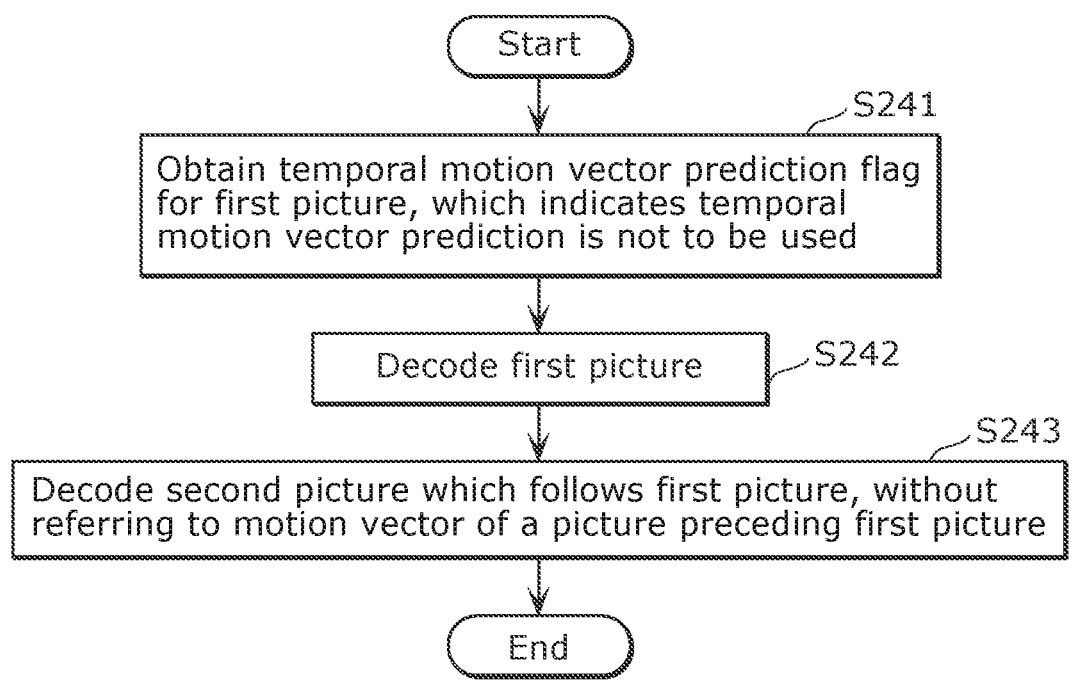
FIG. 9 is a flowchart of the image decoding method according to Embodiment 1.

Next, the operation of the above-described image decoding apparatus 200 shall be described. FIG. 8 is a flowchart of the image decoding process according to this embodiment.

First, the image decoding apparatus 200 obtains reference picture list ordering parameters from a slice header (S201). Furthermore, the image decoding apparatus 200 identifies the order of reference pictures included in one or more reference picture lists and which are to be used for inter prediction of the slice, according to the reference picture list order parameters. Here, a reference picture at a predetermined position in a certain reference picture list is a co-located reference picture.

Next, the image decoding apparatus 200 obtains the temporal motion vector prediction flag from the slice header (S202). Next, the image decoding apparatus 200 judges whether the temporal motion vector prediction flag indicates that temporal motion vector prediction is to be used or is not to be used (S203).

When the flag indicates that temporal motion vector prediction is to be used (Yes in S204), the image decoding apparatus 200 creates a first list of motion vector predictors that include at least one temporal motion vector predictor derived from a motion vector of the co-located reference picture (S205). Next, the image decoding apparatus 200 obtains a first parameter (motion vector predictor selection flag) from the coded bitstream 232 (S206). The first parameter indicates a motion vector predictor selected from the first list, for a decoding target sample block included in the slice.

On the other hand, when the flag indicates that temporal motion vector prediction is not to be used (No in S204), the image decoding apparatus 200 creates a second list of motion vector predictors that do not include a temporal motion vector predictor (S207). Next, the image decoding apparatus 200 obtains a second parameter (motion vector predictor selection flag) from the coded bitstream 232 (S208). Here, the second parameter indicates a motion vector predictor selected from the second list, for the decoding target sample block included in the slice.

After step S206 or S208, the image decoding apparatus 200 performs motion compensated inter prediction using the motion vector predictor indicated by the first parameter or the second parameter to thereby generate a predicted sample block (predicted image 231) (S209). Next, the image decoding apparatus 200 decodes a residual sample block (residual signal 225) from the coded bitstream 232 (S210). Lastly, the image decoding apparatus 200 adds up the predicted sample block (predicted image 231) and the residual sample block (residual signal 225) to thereby generate a reconstructed sample block (decoded image 226) corresponding to the decoding target block (S211).

Furthermore, the image decoding apparatus 200 according to this embodiment obtains, from the coded bitstream 232, a first temporal motion vector prediction flag indicating that temporal motion vector prediction is not to be used on the first picture (start picture). Specifically, the image decoding apparatus 200 obtains, from the headers of all of the slices included in the first picture, the first temporal motion vector prediction flag indicating that temporal motion vector prediction is not to be used.

Next, the image decoding apparatus 200 codes the first picture without using temporal motion vector prediction (S242). Next, the image decoding apparatus 200 codes a second picture which follows the first picture in decoding order, with the referring to a motion vector of a picture preceding the first picture in decoding order being prohibited (S243). It should be noted that details of these processes is equivalent to the processes of the above-described image coding apparatus 100.

Here, step S241 is executed by an obtainment unit included in the image decoding apparatus 200. Furthermore, steps S242 and S243 are executed by a decoding unit included in the image decoding apparatus 200. For example, the obtainment unit may is included in the variable-length decoding unit 212 shown in FIG. 7. Furthermore, the main function of the decoding unit is realized by the inter prediction unit 210 shown in FIG. 7.

[Advantageous Effect of Decoding Invention]

Accordingly, the image decoding apparatus 200 according to this embodiment is capable decoding a coded bitstream which is coded with improved error robustness, flexibility, and coding efficiency of inter prediction using a temporal motion vector predictor.

Although an image coding apparatus and an image decoding apparatus according to the embodiments have been described thus far, the present disclosure is not limited to such embodiments.

Furthermore, the respective processing units included in the image coding apparatus and image decoding apparatus according to the above-described embodiments are typically implemented as an LSI which is an integrated circuit. These processing units may be individually configured as single chips or may be configured so that a part or all of the processing units are included in a single chip.

Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In the respective embodiments, the respective constituent elements are configured using dedicated hardware, but may also be implemented by executing software programs suited to the respective constituent elements. The respective constituent elements may be implemented through the reading and execution of a software program recorded on a recording medium such as a hard disk or semiconductor memory by a program execution unit such as a CPU or a processor.

In addition, the present disclosure may be the aforementioned software program, or a non-transitory computer-readable recording medium on which the aforementioned program is recorded. Furthermore, it should be obvious that the aforementioned program can be distributed via a transmission medium such as the Internet.

Moreover, all numerical figures used in the forgoing description are merely examples for describing the present disclosure in specific terms, and thus the present disclosure is not limited to the illustrated numerical figures.

Furthermore, the separation of the function blocks in the block diagrams is merely an example, and plural function blocks may be implemented as a single function block, a single function block may be separated into plural function blocks, or part of functions of a function block may be transferred to another function block. Furthermore, the functions of function blocks having similar functions may be processed, in parallel or by time-sharing, by a single hardware or software.

Furthermore, the sequence in which the steps included in the above-described image coding method and image decoding method are executed is given as an example to describe the present disclosure in specific terms, and thus other sequences are possible. Furthermore, part of the above-described steps may be executed simultaneously (in parallel) with another step.

Although respective exemplary embodiments have been described, the scope of the Claims of the present application is not limited to such embodiments. Those skilled in the art will readily appreciate that various modifications may be made in these exemplary embodiments and other embodiments may be obtained by arbitrarily combining constituent elements in the respective embodiments without departing from the novel teachings and advantages of the subject matter of the appended Claims. Therefore, such modifications and other embodiments are included in the present disclosure.

Embodiment 2

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 10:
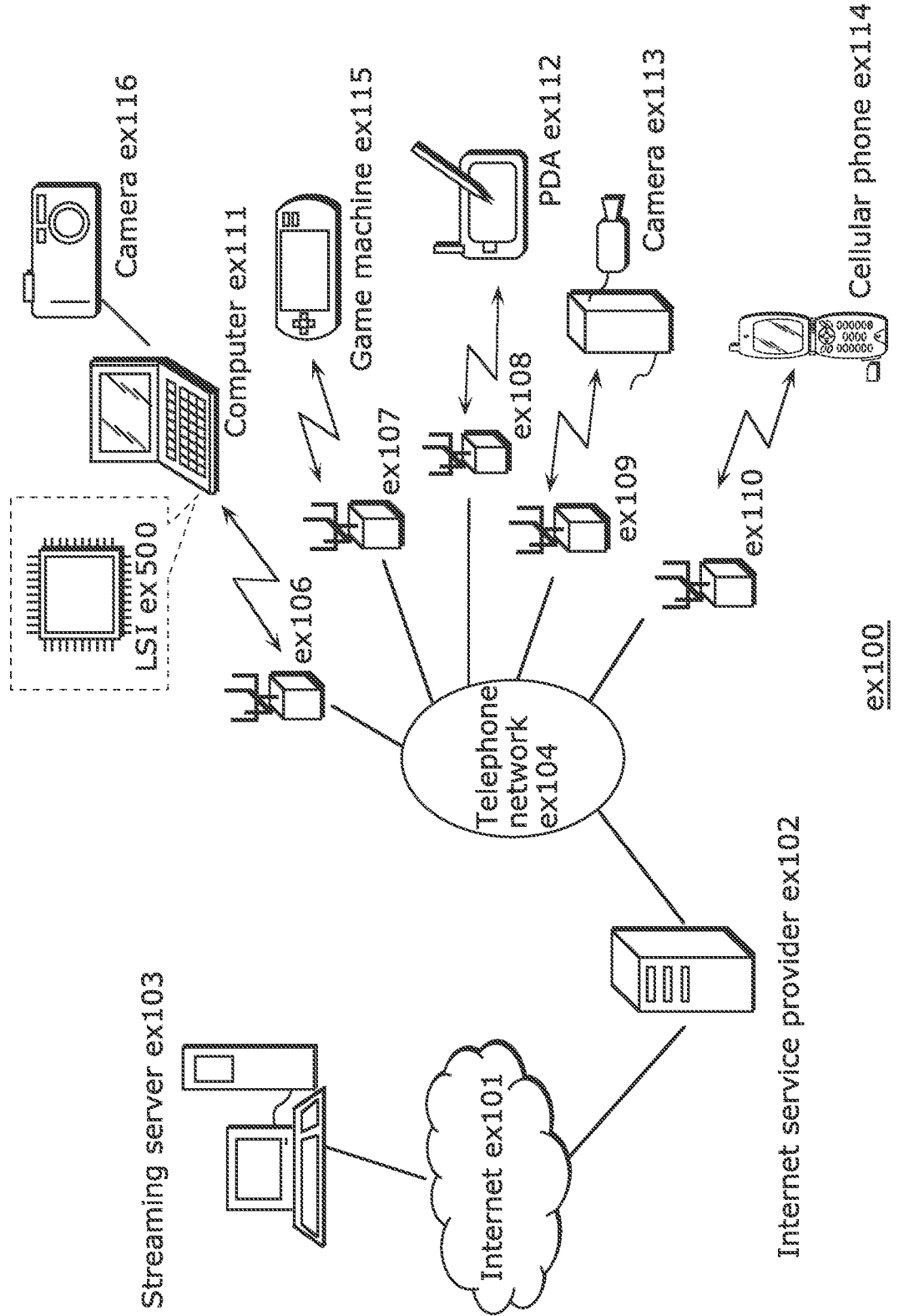
FIG. 10 is a diagram of an overall configuration of a content providing system for implementing content distribution services.

FIG. 10 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 10, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 11:
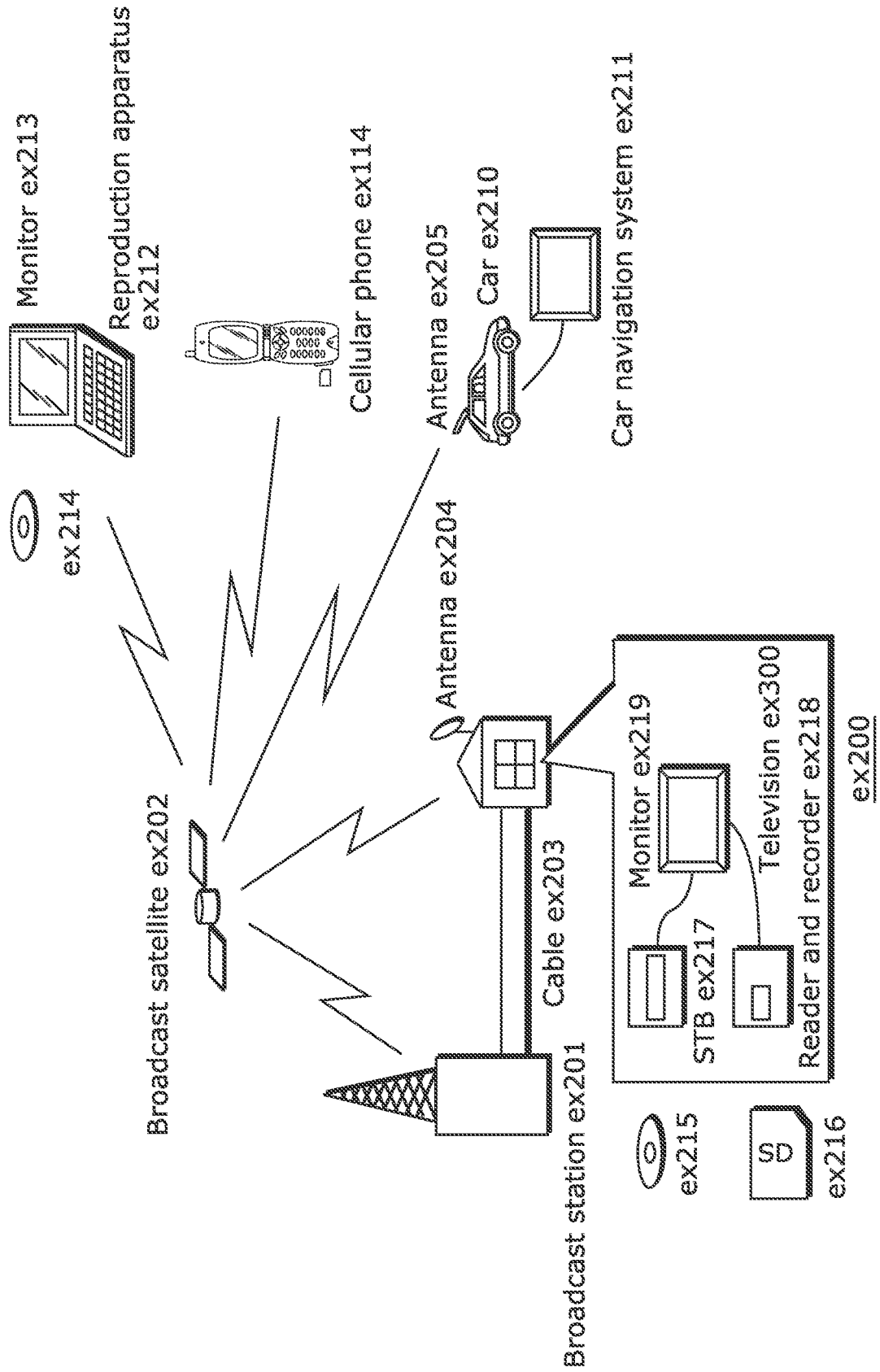
FIG. 11 is a diagram of an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 11. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 12:
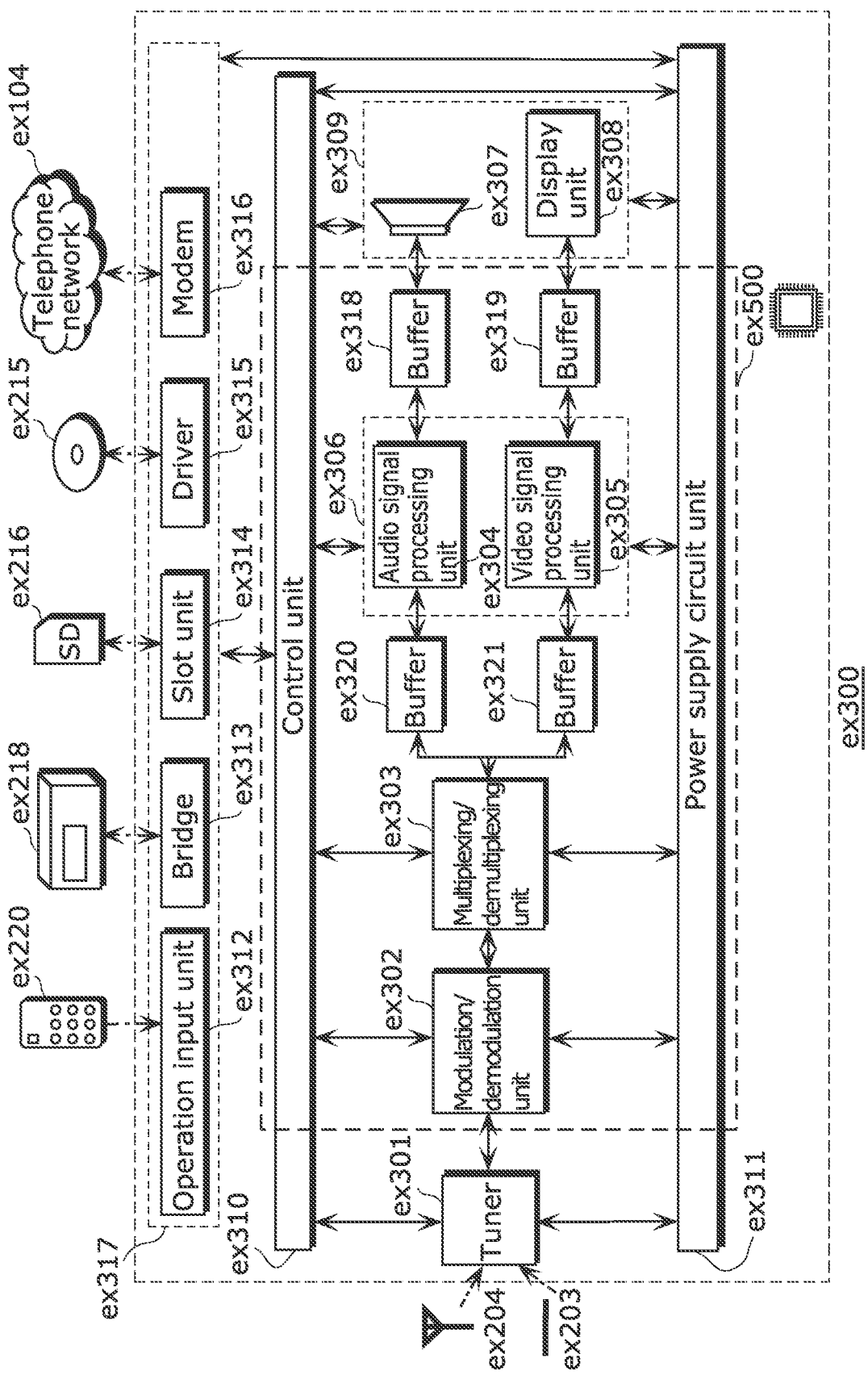
FIG. 12 is a block diagram showing an example of a configuration of a television.

FIG. 12 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 13:
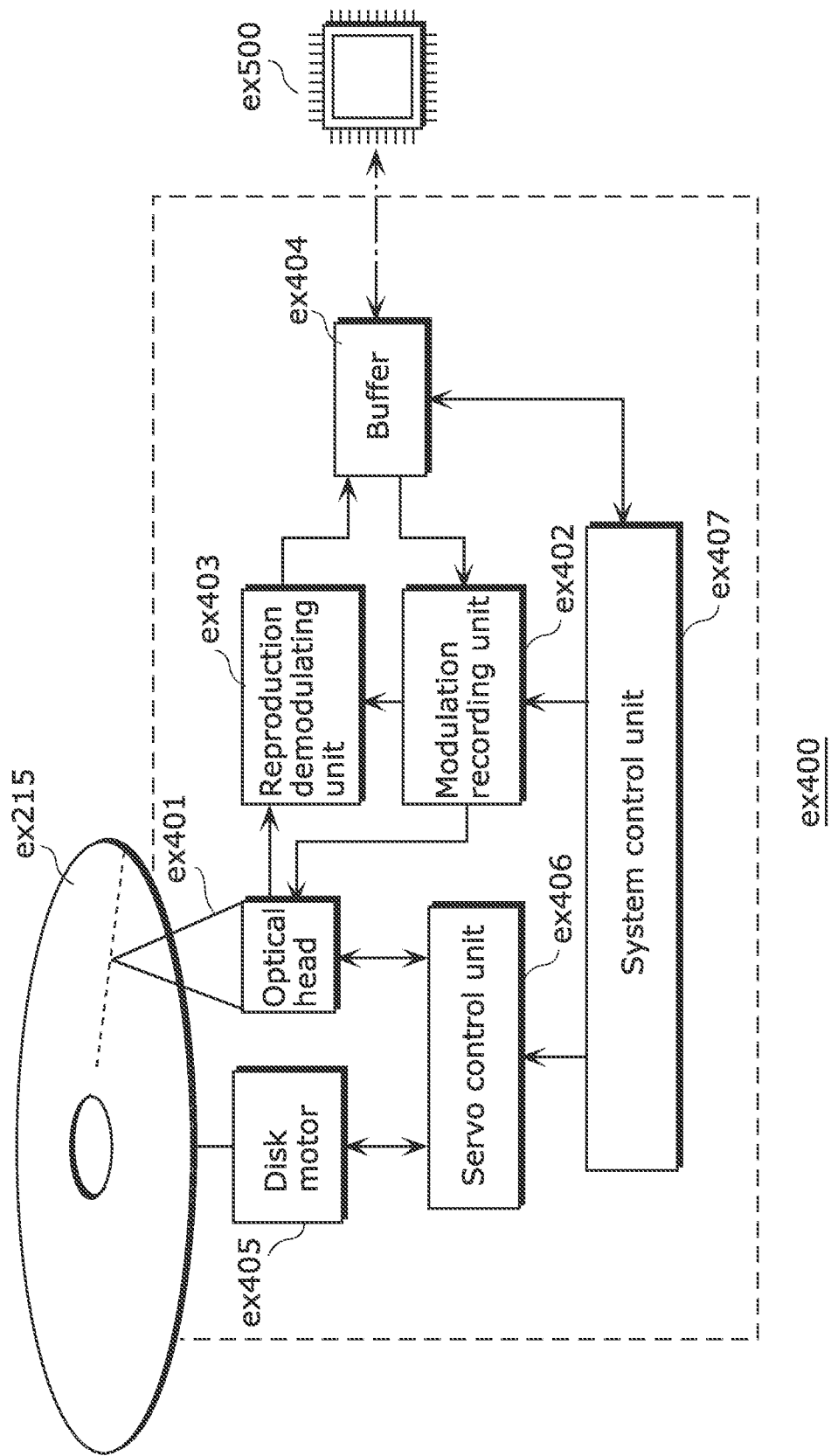
FIG. 13 is a block diagram showing an example of a configuration of an information reproducing/recording unit that reads and writes information from or on a recording medium which is an optical disk.

As an example, FIG. 13 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 14:
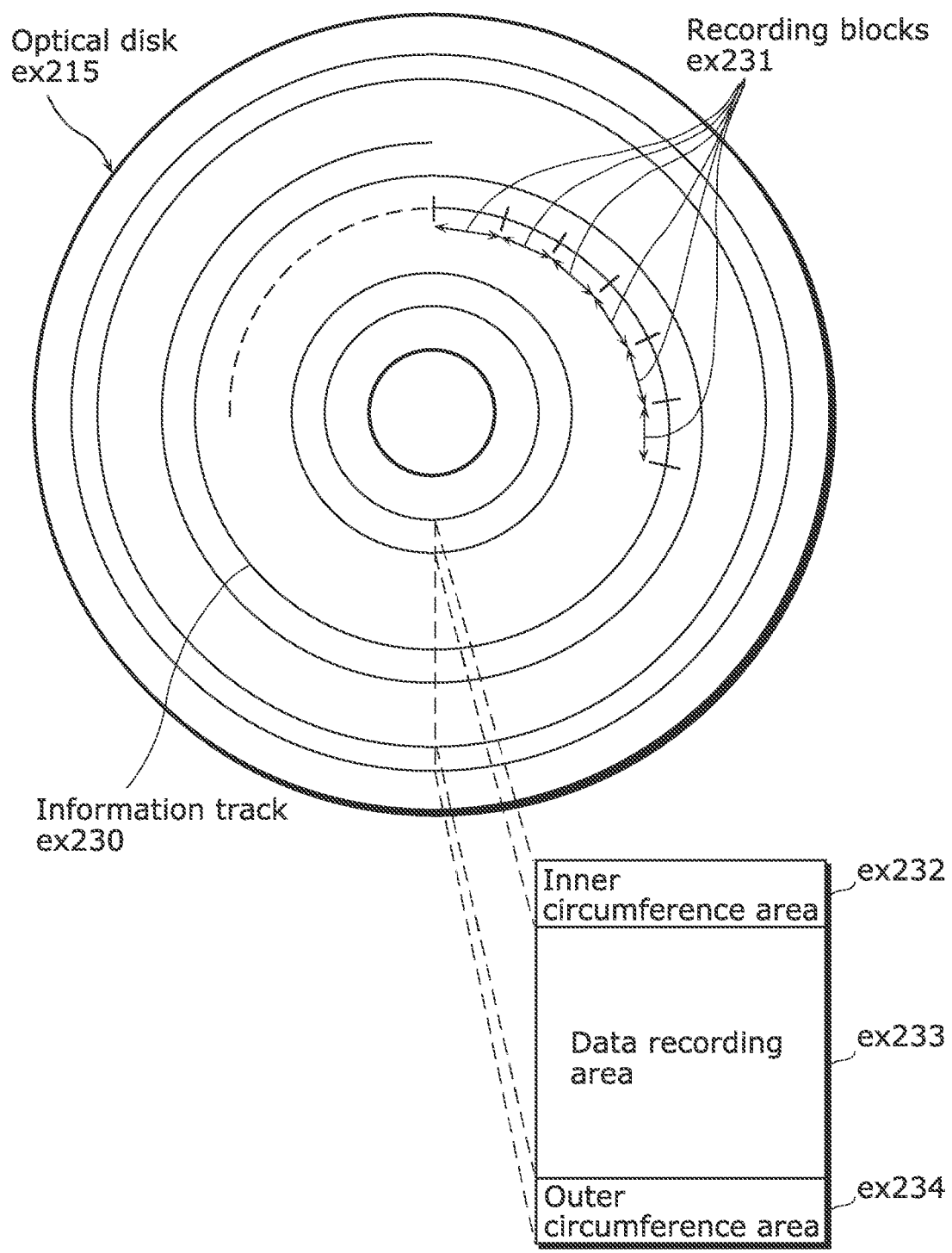
FIG. 14 is a diagram showing an example of a configuration of a recording medium that is an optical disk.

FIG. 14 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 12. The same will be true for the configuration of the computer ex111, the cellular phone ex114, and others.

Figure 15A:
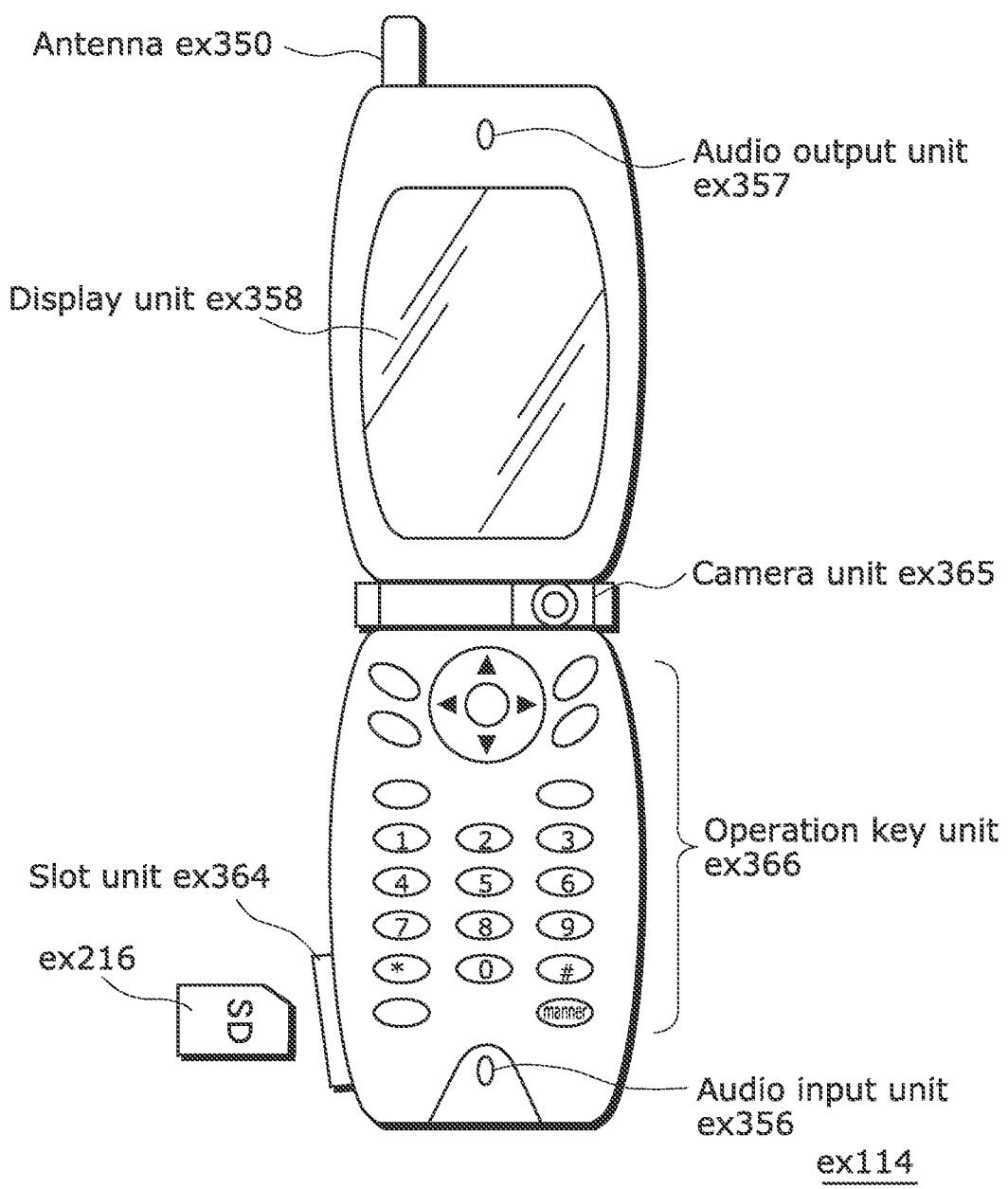
FIG. 15A is a diagram showing an example of a cellular phone.

FIG. 15A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 15B:
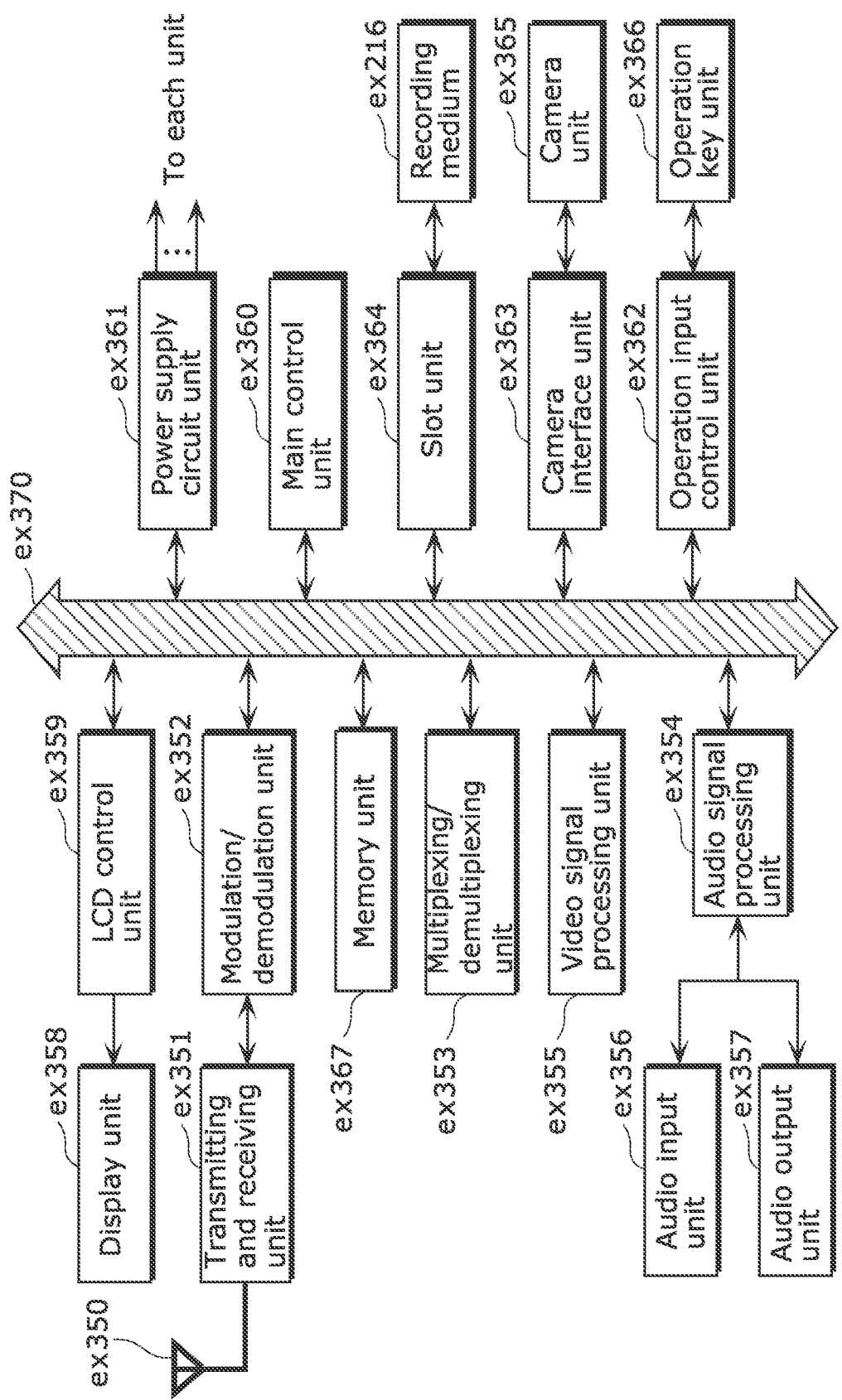
FIG. 15B is a block diagram showing an example of a configuration of a cellular phone.

Next, an example of a configuration of the cellular phone ex114 will be described with reference to FIG. 15B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made to the respective embodiments of the present disclosure described above.

Embodiment 3

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 16 illustrates a structure of the multiplexed data. As illustrated in FIG. 16, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 17:
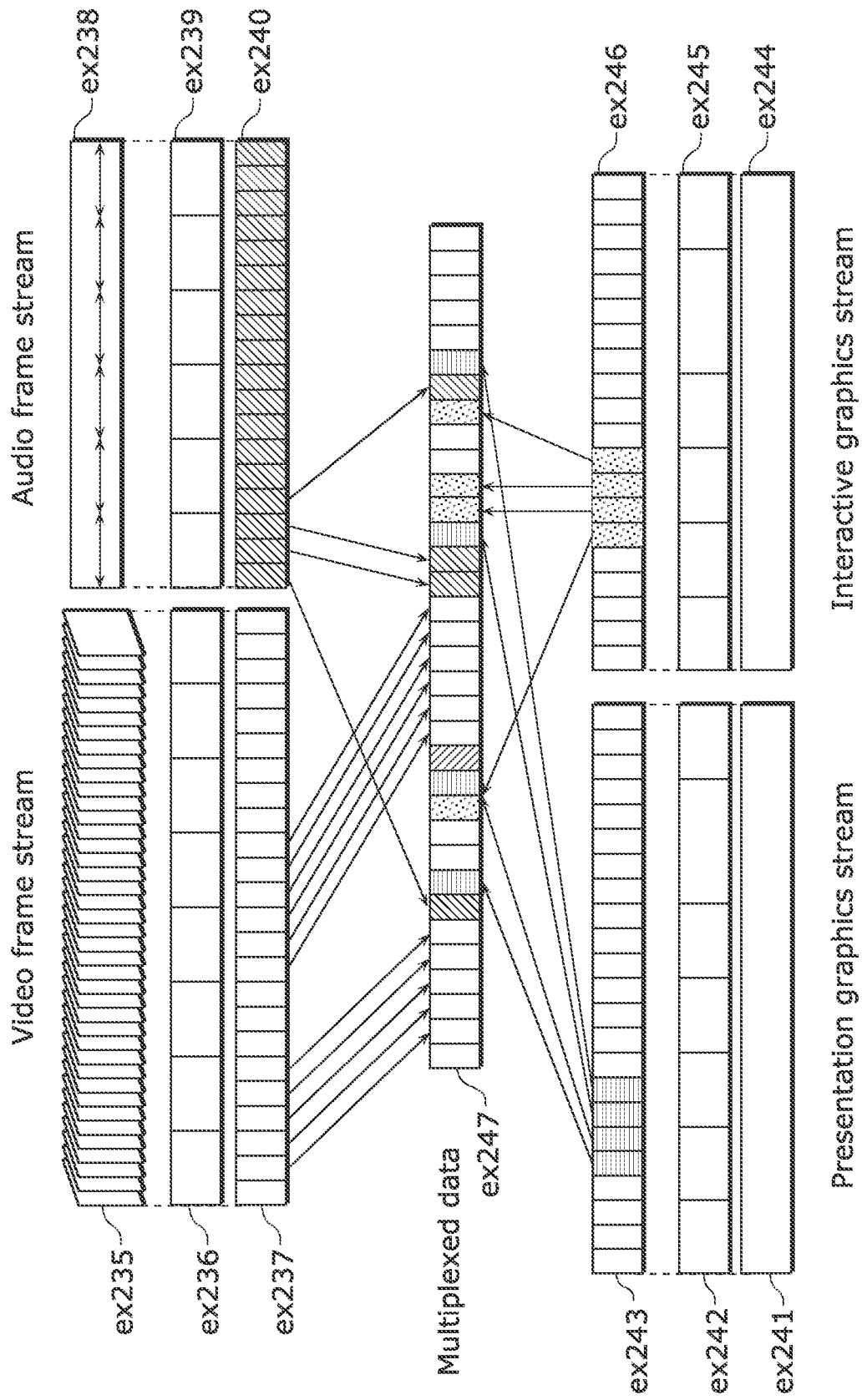
FIG. 17 is a diagram schematically illustrating how each stream is multiplexed in multiplexed data.

FIG. 17 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 18:
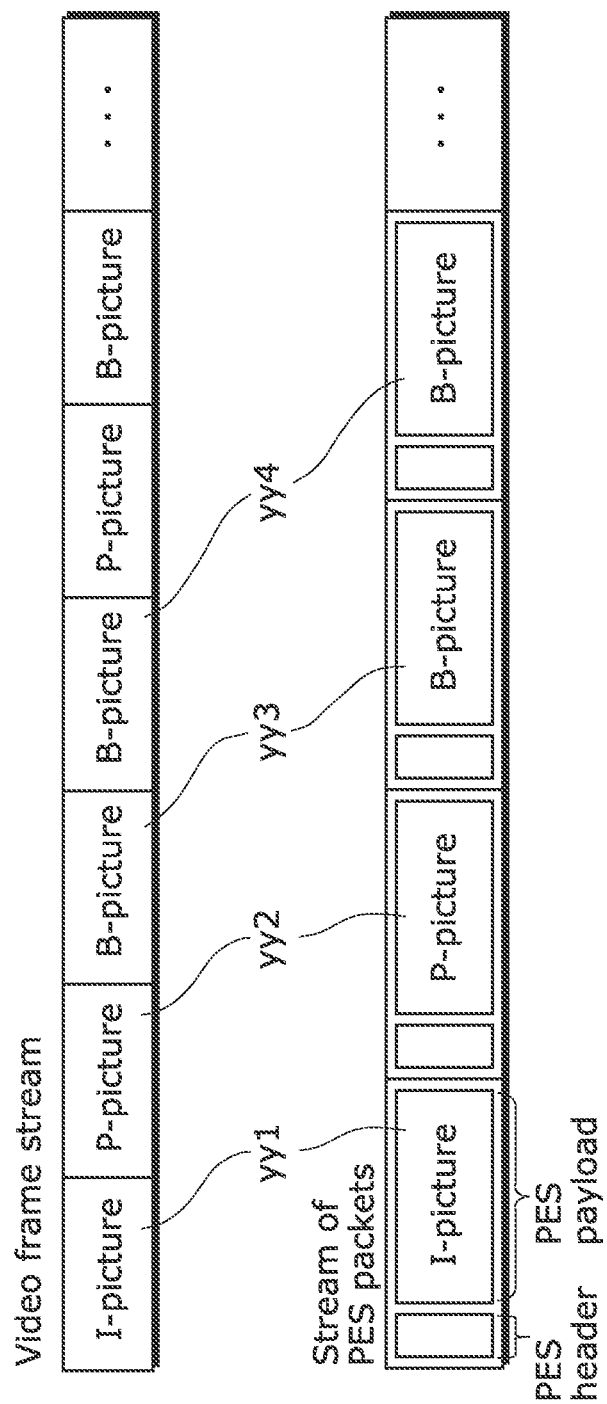
FIG. 18 is a diagram showing in more detail how a video stream is stored in a stream of PES packets.

FIG. 18 illustrates how a video stream is stored in a stream of PES packets in more detail. The first bar in FIG. 18 shows a video frame stream in a video stream. The second bar shows the stream of PES packets. As indicated by arrows denoted as yy1, yy2, yy3, and yy4 in FIG. 18, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 19 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 19. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 20:
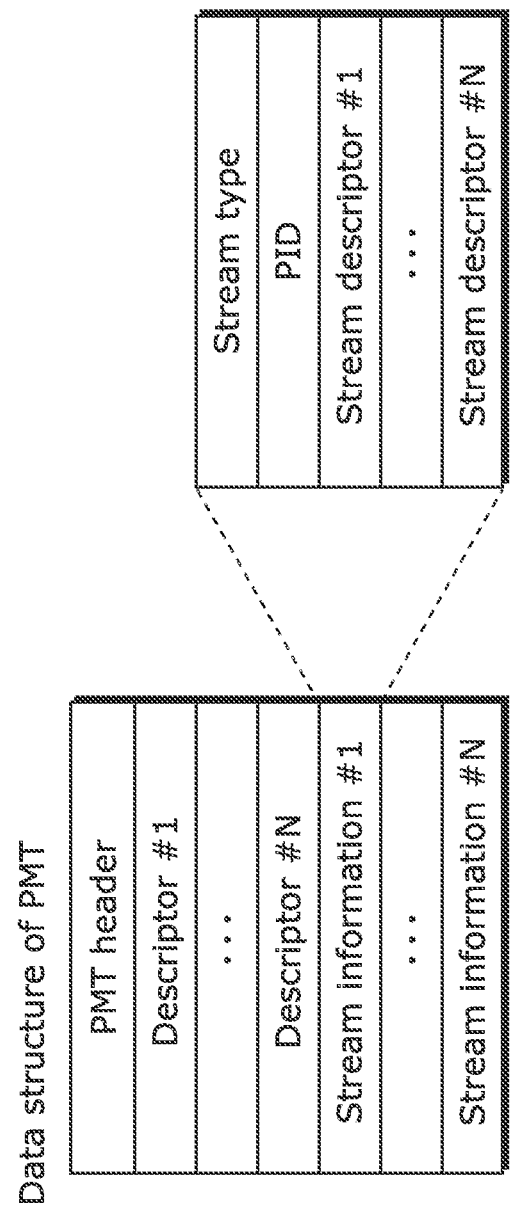
FIG. 20 is a diagram illustrating a data structure of a PMT.

FIG. 20 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 21:
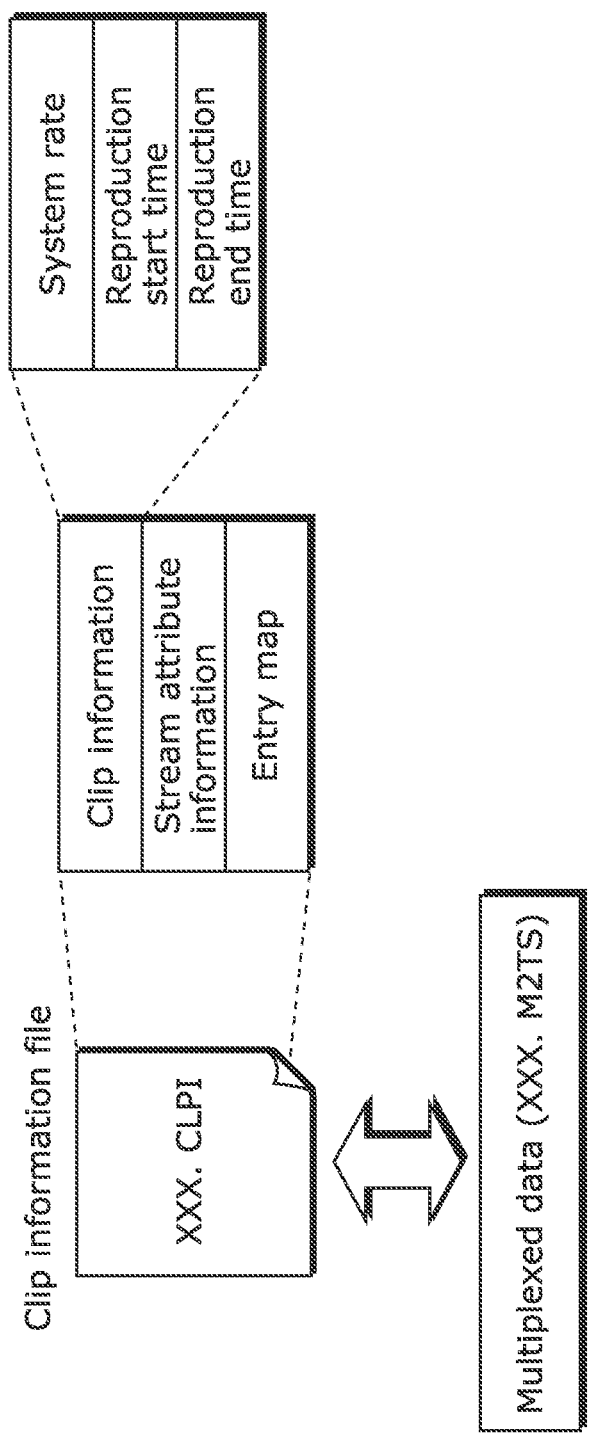
FIG. 21 is a diagram showing an internal structure of multiplexed data information.

Each of the multiplexed data information files is management information of the multiplexed data as shown in FIG. 21. The multiplexed data information files are in one to one correspondence with the multiplexed data, and each of the files includes multiplexed data information, stream attribute information, and an entry map.

As illustrated in FIG. 21, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 22:
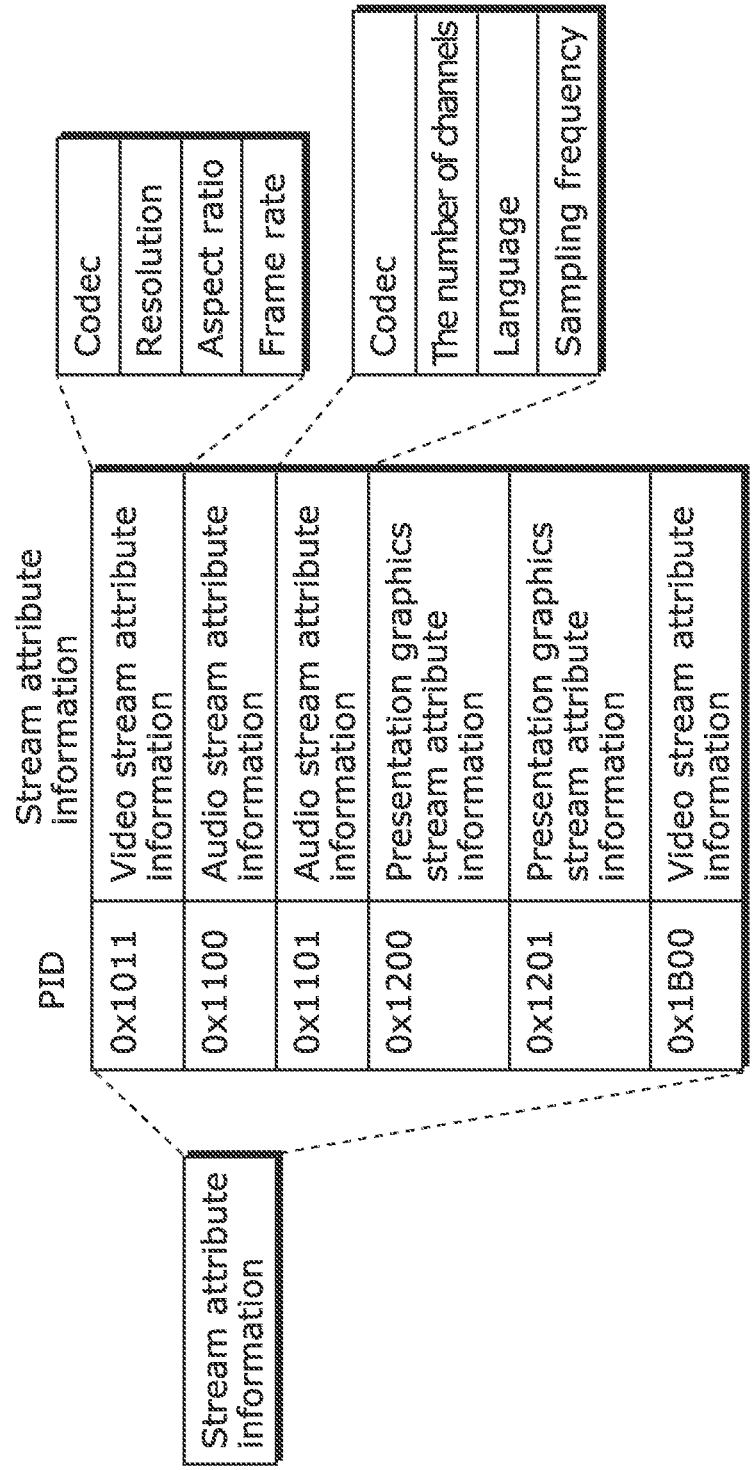
FIG. 22 is a diagram showing an internal structure of stream attribute information.

As shown in FIG. 22, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 23:
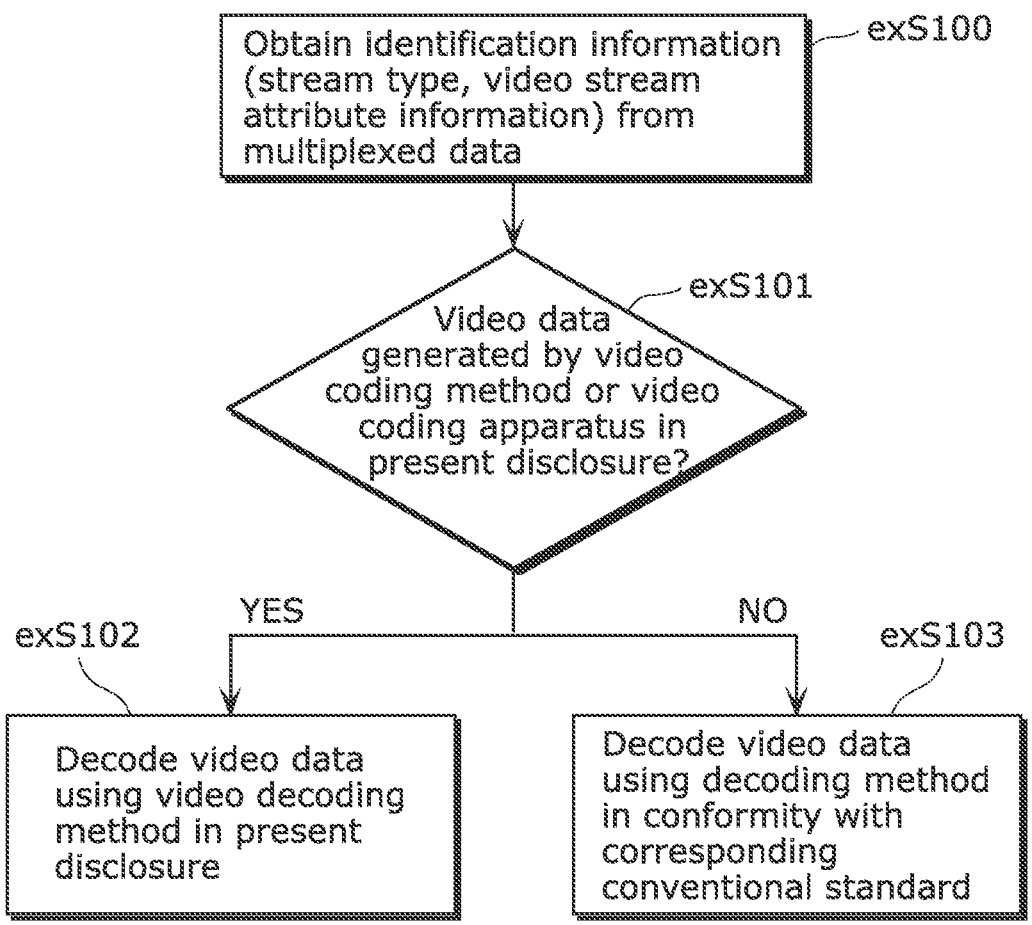
FIG. 23 is a diagram showing steps for identifying video data.

Furthermore, FIG. 23 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 4

Figure 24:
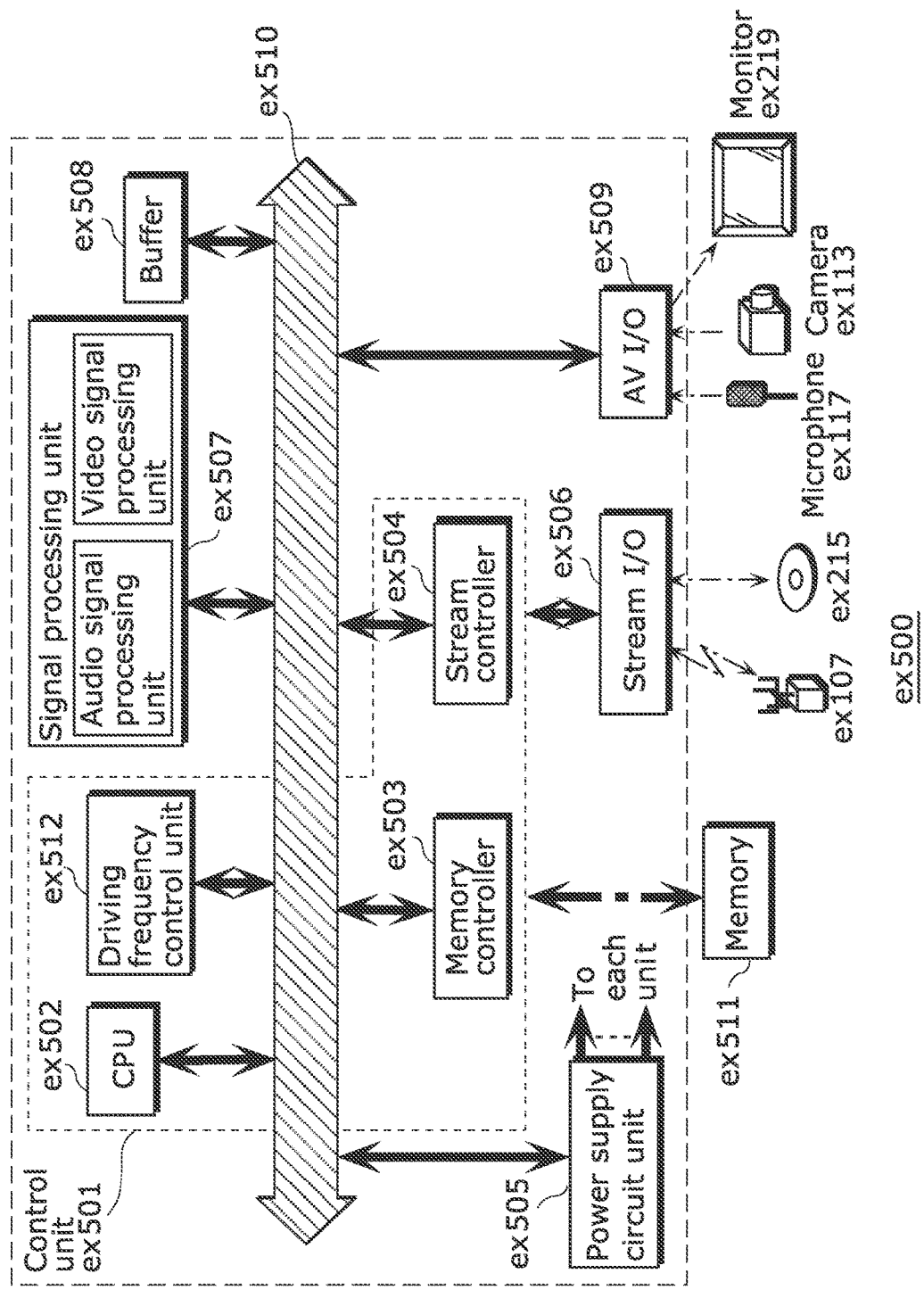
FIG. 24 is a block diagram illustrating an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 24 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 5

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 25:
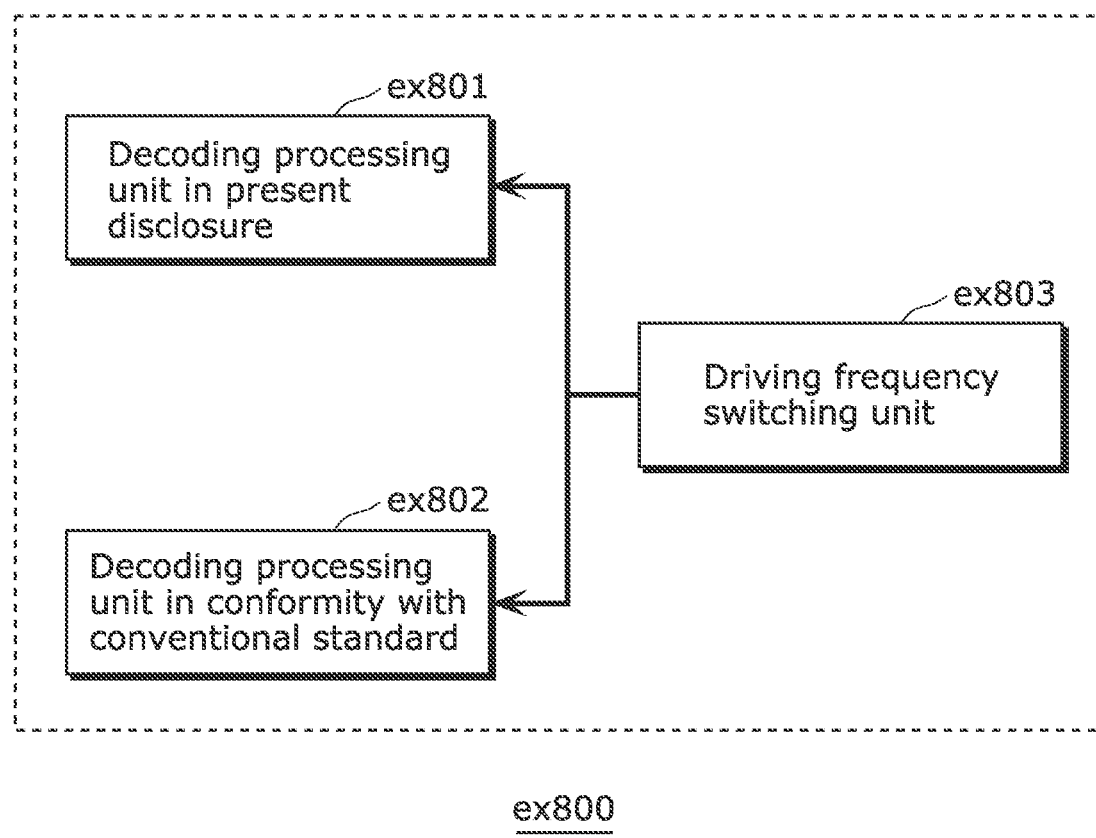
FIG. 25 is a diagram showing a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 25 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 24. Here, each of the decoding processing unit ex801 that executes the moving picture decoding method described in each of embodiments and the decoding processing unit ex802 that conforms to the conventional standard corresponds to the signal processing unit ex507 in FIG. 24. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. It is possible that the identification information described in Embodiment 3 is used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 27. The driving frequency can be selected by storing the look-up table in the buffer ex508 and in an internal memory of an LSI, and with reference to the look-up table by the CPU ex502.

Figure 26:
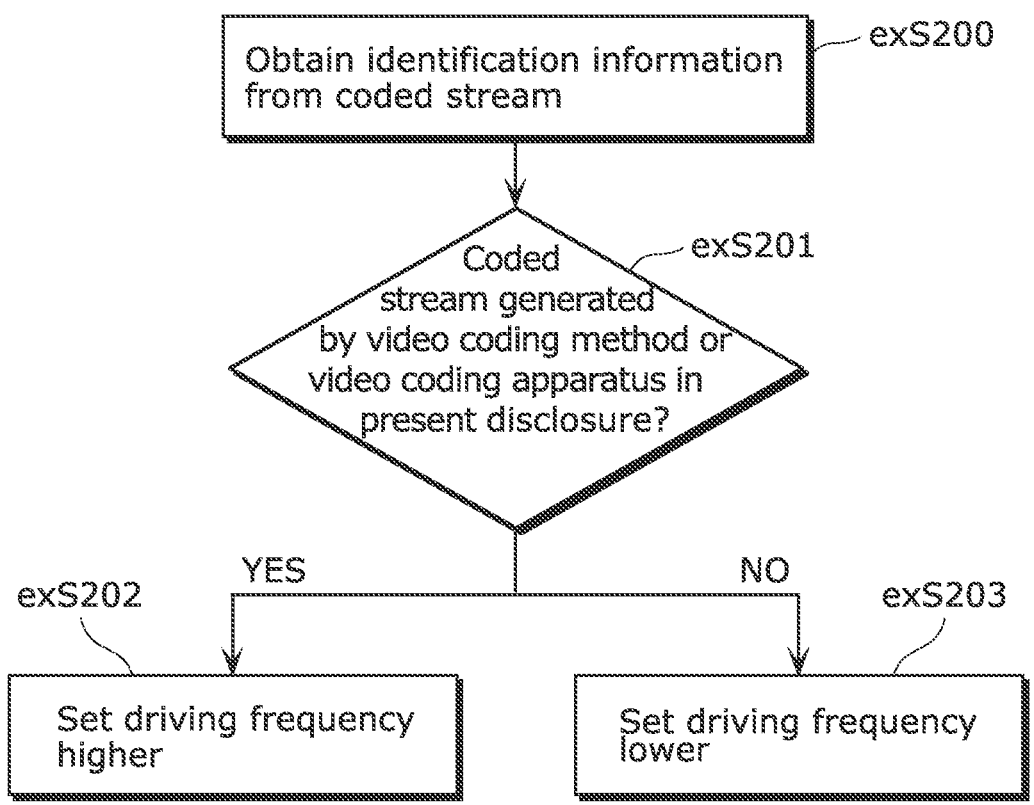
FIG. 26 is a diagram showing steps for identifying video data and switching between driving frequencies.

FIG. 26 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 28A:
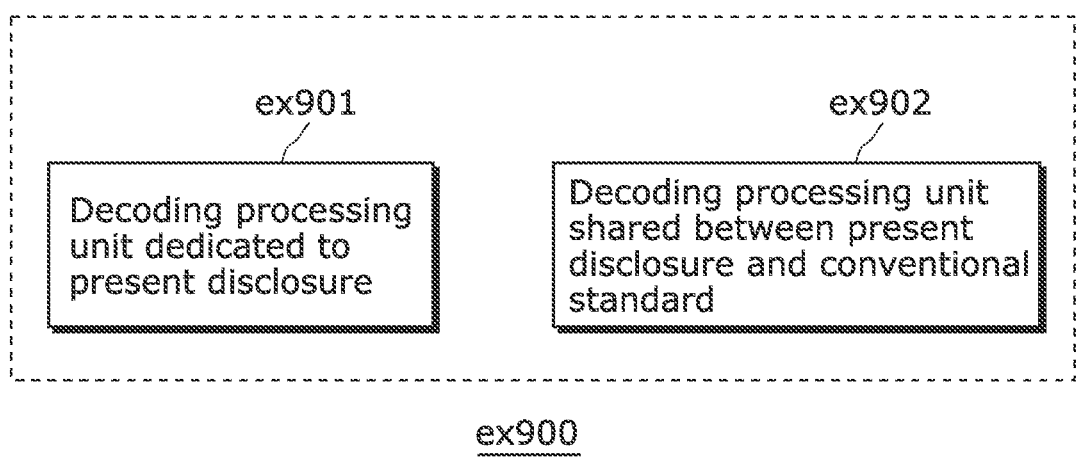
FIG. 28A is a diagram illustrating an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 28A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present disclosure and does not conform to MPEG-4 AVC. In particular, since the aspect of the present disclosure is characterized by inter prediction, it is possible, for example, for the dedicated decoding processing unit ex901 to be used for inter prediction, and for the decoding processing unit to be shared by any or all of the other processing, such as entropy decoding, inverse quantization, deblocking filtering, and motion compensation. The decoding processing unit for implementing the moving picture decoding method described in each of embodiments may be shared for the processing to be shared, and a dedicated decoding processing unit may be used for processing unique to that of MPEG-4 AVC.

Figure 28B:
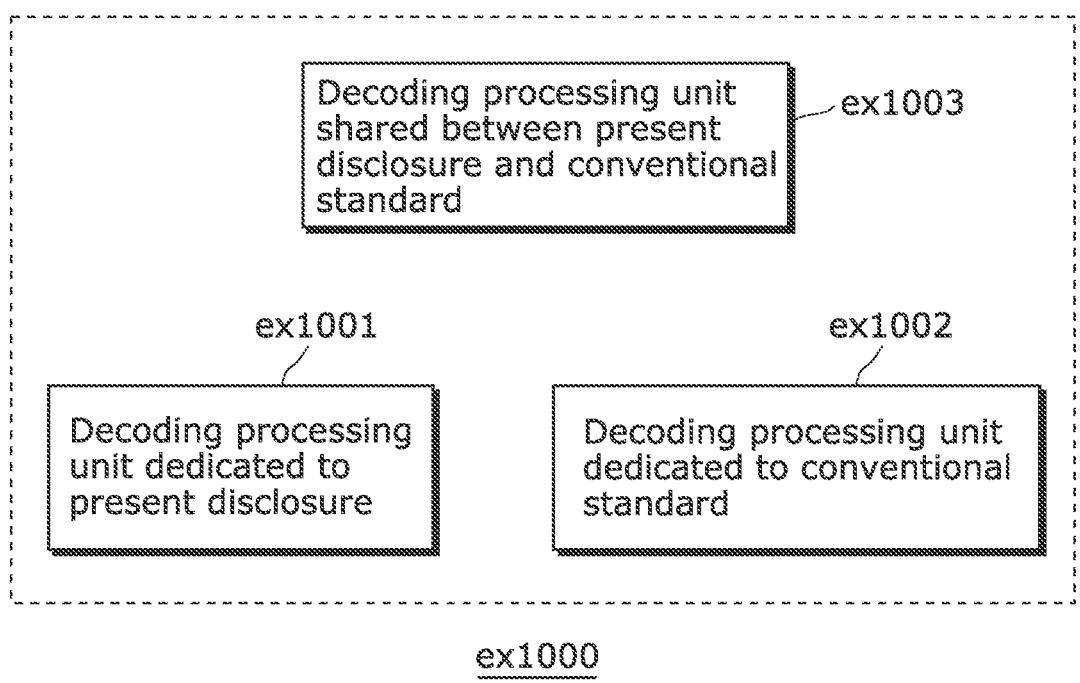
FIG. 28B is a diagram showing another example of a configuration for sharing a module of the signal processing unit.

Furthermore, ex1000 in FIG. 28B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The present disclosure can be applied to an image coding method, an image decoding method, an image coding apparatus, and an image decoding apparatus. For example, the present disclosure can be used in information display devices and image-capturing devices such as a television, a digital video recorder, a car navigation system, a cellular phone, a digital still camera, a digital video camera, and so on.

The invention claimed is:

1. A transmission apparatus for sending a bitstream, the bitstream including:
- a plurality of pictures including a first picture and a second picture; and
- a flag indicating whether or not temporal motion vector prediction is to be performed on the first picture, the temporal motion vector prediction using a motion vector of a co-located reference picture;

wherein the bitstream is coded by a coding method including:

(A-1) when the flag indicates that the temporal motion vector prediction is not performed on the first picture, coding the first picture by using inter-prediction without performing the temporal motion vector prediction;

(A-2) when the flag indicates that the temporal motion vector prediction is performed on the first picture, coding the first picture by using the temporal motion vector prediction;

(B-1) when the flag indicates that the temporal motion vector prediction is not to be performed on the first picture, generating a motion vector prediction list for a second picture, the second picture (i) following the first picture in coding order and (ii) being coded by using the temporal motion vector prediction, the motion vector prediction list (i) including a temporal motion prediction vector derived by using a motion vector of a co-located reference picture, the co-located reference picture being the first picture and (ii) not including temporal motion prediction vectors derived by using motion vectors of all co-located reference pictures preceding the first picture in coding order;

(B-2) when the flag indicates that the temporal motion vector prediction is to be performed on the first picture, generating the motion vector prediction list for the second picture which includes a temporal motion prediction vector derived by using a motion vector of a co-located reference picture preceding the first picture in coding order; and (C) coding the second picture by using the temporal motion vector prediction using the temporal motion prediction vector selected from the motion vector prediction list, wherein the step (A-2) includes (i) creating a first list of motion vector predictors that includes at least one temporal motion vector predictor derived from the motion vector of the co-located reference picture, (ii) selecting a first parameter indicating a first motion vector predictor included in the first list, (iii) writing the first parameter into a bitstream, and (iv) coding the first picture using the first motion vector predictor indicated by the first parameter, wherein the step (A-1) includes (i) creating a second list of motion vector predictors that does not include the temporal motion vector predictor derived from the motion vector of the co-located reference picture, (ii) selecting a second parameter indicating a second motion vector predictor included in second list, (iii) writing the second parameter into the bitstream, and (iv) coding the first picture using the second motion vector predictor indicated by the second parameter, and wherein a number of the motion vector predictors included in the first list and a number of the motion vector predictors included in the second list are same.

* * * * *